US010769056B2

(12) United States Patent
Maliani et al.

(10) Patent No.: US 10,769,056 B2
(45) Date of Patent: Sep. 8, 2020

(54) SYSTEM FOR AUTONOMOUSLY TESTING A COMPUTER SYSTEM

(71) Applicant: The Ultimate Software Group, Inc., Weston, FL (US)

(72) Inventors: John A. Maliani, Pembroke Pines, FL (US); Robert L. Vanderwall, Weston, FL (US); Michael L. Mattera, Coral Springs, FL (US); Dionny Santiago, Weston, FL (US); Brian R. Muras, Weston, FL (US); Keith A. Briggs, Coral Springs, FL (US); David Adamo, Sunrise, FL (US); Tariq King, Pembroke Pines, FL (US)

(73) Assignee: The Ultimate Software Group, Inc., Weston, FL (US)

( * ) Notice: Subject to any disclaimer, the term of this patent is extended or adjusted under 35 U.S.C. 154(b) by 271 days.

(21) Appl. No.: 15/905,362

(22) Filed: Feb. 26, 2018

(65) Prior Publication Data

US 2019/0266076 A1 Aug. 29, 2019

(51) Int. Cl.
*G06F 11/36* (2006.01)
(52) U.S. Cl.
CPC ...... *G06F 11/3688* (2013.01); *G06F 11/3684* (2013.01); *G06F 11/3692* (2013.01)
(58) Field of Classification Search
CPC .............. G06F 11/079; G06F 11/0793; G06F 11/3447–3457; G06F 11/3684–3692
(Continued)

(56) References Cited

U.S. PATENT DOCUMENTS 5,045,994 A 9/1991 Belfer et al.
7,386,521 B2 6/2008 Adir et al.
(Continued)

FOREIGN PATENT DOCUMENTS

CN 101937438 6/2013
CN 102693183 4/2015
(Continued)

OTHER PUBLICATIONS

Kephart et al. "The vision of autonomic computing," Computer 36.1, 2003, pp. 41-50. http://130.18.208.80/~ramkumar/acvision.pdf.

(Continued)

*Primary Examiner* — Joseph R Kudirka
(74) *Attorney, Agent, or Firm* — Akerman LLP; Mammen (Roy) P. Zachariah, Jr.

(57) ABSTRACT

A system for autonomously testing a computing system is disclosed. The system parses data obtained from a variety of sources, and extracts source concepts from the parsed data to generate models for inclusion in a set of agglomerated models. The system interacts with and explores features of a software application being tested by the system. Outputs and information obtained from the interaction are utilized by the system to update the models or generate new models for the set of agglomerated models. The agglomerated models are utilized by the system to execute tests on the application to detect potential defects and conflicts. Detected defects and conflicts may be included in a report for review. Feedback on the defects and conflicts may be utilized to further update the agglomerated models. The agglomerated models are updated recursively as additional data is obtained, further interactions are performed, and further outputs are generated over time.

27 Claims, 10 Drawing Sheets

(58) Field of Classification Search
USPC .......................................................... 714/26
See application file for complete search history.

(56) References Cited

U.S. PATENT DOCUMENTS

| | | | |
|---|---|---|---|
| 7,428,700 | B2 | 9/2008 | Wen et al. |
| 7,478,281 | B2 | 1/2009 | Denniston |
| 7,599,831 | B2 | 10/2009 | Ford |
| 7,694,181 | B2 | 4/2010 | Noller et al. |
| 7,712,000 | B2 | 5/2010 | Khoche et al. |
| 7,797,687 | B2 | 9/2010 | Tillmann et al. |
| 7,849,425 | B1 | 12/2010 | Hamid et al. |
| 7,895,148 | B2 | 2/2011 | Ma et al. |
| 7,937,622 | B2 | 5/2011 | Mehrotra |
| 7,958,495 | B2 | 6/2011 | Kelso |
| 8,301,998 | B2 | 10/2012 | Ruvini |
| 8,473,913 | B2 | 6/2013 | Noller et al. |
| 8,479,164 | B2 | 7/2013 | Becker et al. |
| 8,640,084 | B2 | 1/2014 | Murthy |
| 8,683,442 | B2 | 3/2014 | Peranandam et al. |
| 8,683,446 | B2 | 3/2014 | Paradkar et al. |
| 9,116,725 | B1 | 8/2015 | Baird |
| 9,223,669 | B2 | 12/2015 | Lin |
| 9,536,522 | B1 | 1/2017 | Hall et al. |
| 9,563,545 | B2 | 2/2017 | Bennah et al. |
| 10,025,656 | B2 * | 7/2018 | Hosabettu ............... G06F 16/22 |
| 2004/0015846 | A1 | 1/2004 | Haisraeli |
| 2005/0028077 | A1 | 2/2005 | Wen et al. |
| 2006/0106798 | A1 | 5/2006 | Wen et al. |
| 2007/0156720 | A1 | 7/2007 | Maren |
| 2010/0064282 | A1 | 3/2010 | Triou et al. |
| 2013/0074043 | A1 | 3/2013 | Fu |
| 2015/0205782 | A1 | 7/2015 | Subramanya et al. |
| 2016/0055077 | A1 | 2/2016 | Baloch et al. |
| 2016/0294856 | A1 * | 10/2016 | Boia ................... H04L 63/1425 |
| 2017/0010956 | A1 | 1/2017 | Chen et al. |
| 2017/0024311 | A1 | 1/2017 | Andrejko et al. |
| 2019/0166024 | A1 * | 5/2019 | Ho ..................... H04L 41/0631 |

FOREIGN PATENT DOCUMENTS

| | | |
|---|---|---|
| CN | 104516818 | 4/2015 |
| WO | 2005059744 | 6/2005 |
| WO | 2016004657 | 1/2016 |

OTHER PUBLICATIONS

Appavoo et al., "Enabling autonomic behavior in systems software with hot swapping." IBM systems journal 42.1, 2003, pp. 60-76. https://pdfs.semanticscholar.org/ee1b/c723187317a3bebd0af01d218e51b818b16b.pdf.

Petke et al., "Genetic Improvement of Software: a Comprehensive Survey," IEEE Transactions on Evolutionary Computation, vol. PP, Issue: 99, pp. 1-1, Apr. 25, 2017, Print ISSN: 1089-778X, Electronic ISSN: 1941-0026, DOI: 10.1109/TEVC.2017.2693219, http://ieeexplore.ieee.org/stamp/stamp.jsp?arnumber=7911210.

Kelong et al., "Implementation of automated testing system for android applications based on dynamic taint propagation," 2014 Communications Security Conference, pp. 1-5, DOI: 10.1049/cp.2014.0736, Referenced in: Cited by: Papers (1) IET Conference Publications. http://ieeexplore.ieee.org/stamp/stamp.jsp?tp=8,arnumber=6992229.

Sterritt et al., "Autonomic Computing—a means of achieving dependability?." Engineering of Computer-Based Systems, 10th IEEE International Conference and Workshop on the IEEE, 2003.

Truszkowski et al., "The Challenge of Building Autonomous Software." IT Professional, vol. 6, Sep.-Oct. 2004, pp. 47-52, published Nov. 30, 2004, IISSN: 1520-9202, INSPEC Accession No. 8202596 DOI: 10.1109/MITP.2004.66.

* cited by examiner

User Information:

Prefix: ☐

First Name*: ☐

Middle Initial: ☐

Last Name*: ☐

Street Address*: ☐

Street Address*: ☐

City*: ☐

State*: ☐

Zip Code*: ☐

( Cancel )  ( Save )

User Information:

Prefix: ☐

First Name*: ☐

Middle Initial: ☐

Last Name*: ☐

Suffixes: ☐

Street Address*: ☐

Street Address*: ☐

City*: ☐

State*: ☐

Zip Code*: ☐

(Cancel)  (Save)

User Information:

Prefix: ☐

First Name*: ☐

Middle Initial: ☐

Last Name*: ☐

Username*: ☐

Password*: ☐

Phone Number*: ☐

Email Address*: ☐

Street Address*: ☐

Street Address*: ☐

City*: ☐

State*: ☐

Zip Code*: ☐

(Cancel)   (Save)

FIG. 8

SYSTEM FOR AUTONOMOUSLY TESTING A COMPUTER SYSTEM

FIELD OF THE INVENTION

The present application relates to computing technologies, machine learning technologies, testing technologies, software evaluation technologies, software optimization technologies, and more particularly, to a system and method for autonomously testing a computer system.

BACKGROUND

In today's technologically-driven society, various computing systems implemented via computer software are increasingly serving as a backbone for providing various products and services to users. In order to reliably deliver, test, train, navigate, analyze, and extend these computing systems, it is increasingly important to develop a model understanding of both the expected and actual operation of these systems, which can be both verified and/or validated. While attempts have been made to build models of computing system behavior from user stories and documentation, such attempts have failed to overcome issues relating to missing data and requirement inconsistencies that are inherent in continuously developed user stories and documentation. For example, given a complete and detailed model of a desired computing system, there are testing systems that exist, which are capable of generating and executing tests to verify if the desired computing system satisfies some of the desired functionality as represented by the model. However, such existing systems cannot be utilized within continuous development environments, and their application within more static and slowly-changing development environments requires careful and time-consuming development of the desired computing system model. Additionally, such systems do not substantially eliminate the additional manual labor involved in generating the desired computing system model. Instead, existing testing systems often shift the manual effort from that of model development to one of detailed requirements development. Furthermore, existing testing systems cannot effectively relate generated models to user stories, requirements, or other data sources that may define the desired functionality of the computing system being tested. As a result, testing of the generated models generates tautological results of limited utility, and existing systems cannot discover discrepancies between a generated model and the desired functionality of the computing system being tested. Moreover, existing testing systems are incapable of producing tests that verify whether the desired functionality truly exists within the tested computing system.

As a result, it has become increasingly important that such computing systems operate as they are intended so as to ensure optimal service and minimal downtime for users. Given the complexity and criticality of many software computing systems, the testing of such systems is an important and often expensive aspect of product and computing system development. To that end, various systems and methods exist for evaluating computer systems, computer programs, and computing devices. For example, for traditional testing systems, it is necessary to start the testing process with manually developed models or very detailed system requirements. Unfortunately, such existing testing systems are not effective when dealing with continuously developed user stories and documentation that describe one or more features of a computing system being evaluated by the testing systems. Such ineffectiveness is often due to the time-consuming nature of complex model creation and maintenance.

Based on the foregoing, current testing technologies and processes may be modified and improved so as to provide enhanced functionality and features. Such enhancements and improvements may effectively decrease the manpower and effort required to generate models, tests, and test results, while simultaneously improving their coverage and accuracy. Additionally, such enhancements and improvements may provide for optimized model generation, higher quality validation testing, increased autonomy, improved interactions with users or devices, improved user satisfaction, increased efficiencies, increased access to meaningful data, substantially-improved decision-making abilities, and increased ease-of-use. Furthermore, such enhancements and improvements, particularly considering today's continual development environment, may assist in maintaining pace with development efforts.

SUMMARY

A system and accompanying methods for autonomously constructing a verified and/or validated agglomerated model of an application supporting a computing system are disclosed. Notably, the system and accompanying methods may be utilized to conduct static discovery from data and information to generate and/or update one or more models to be included in a set of agglomerated models, conduct dynamic discovery based on interactions with the application of the computing system to generate and/or update one or more models for the set of agglomerated models, generate on-demand autopilots for navigating through the computing system, enhance features of the application of the computing system, generate media content associated with the application of the computing system, and perform a variety of other functions as described in the present disclosure. Notably, the models may be utilized to capture and represent the differences between the actual performance of the application being evaluated using the system and methods and what is expected when the desired requirements for the application are taken into consideration. Each model generated and/or updated using the functionality provided by the system and accompanying methods may be validated. In validating a model, the system and methods may include checking and/or comparing the model against internal and/or external requirements, data, specifications, and documented expectations of an application under evaluation that supports the computing system. In certain embodiments, the expectations may be described in text or media of the application under evaluation itself and do not have to obtained from external sources. For example, if the text of the application asks that a user enter in a phone number into the application with a certain formatting on the page, the description of the expected functionality may be an implicit requirement that may be validated against the model of the application. The system and accompanying methods may also verify the models in addition to validating the models. The models may be verified by checking that the system performs against the models in an expected manner, where parts of the models may be generated by utilizing information drawn from the internal and/or external user stories, requirements, data, specifications and documented expectations.

Once verified and/or validated, the verified and/or validated agglomerated model may facilitate the autonomous testing of the application of the computing system. In particular, the system and accompanying methods enable the generation, execution, and evaluation of valid and useful automated test cases and the automated updating of the generation, execution, and evaluation mechanism to account for changes in the application of the computing system being tested. When testing the application, the system and methods may compare the performance of the application being evaluated against one or more models of the set of agglomerated models. In certain embodiments, the testing may be performed against an agglomerated model that reflects the expected performance of the application as observed—irrespective of the requirements. In certain embodiments, the testing may be performed against a version of an agglomerated model that incorporates expectations from external and/or internal requirements, user stories, specifications, etc. The testing may be utilized to verify actual performance of the application being evaluated using the systems and methods with respect to the agglomerated model when the model is used as part of an analysis tool, when the model is used for the automatic generation of paths for autopilot and training uses cases as described in the present disclosure, and/or when the model is used for the automated extension of features of the application being evaluated.

In contrast to existing technologies, the system and accompanying methods recursively utilize an application under evaluation to provide the context to connect disparate and fragmented sources of data, such as, but not limited to, user stories, requirements, documentation, domain knowledge, external information, test cases, computer software code, and other data related to the desired functionality of the computing system supported by the application, into a complete and testable model. The system and methods' use of the discovered model associated with the application under evaluation to connect the broad variety of internal and external information is unique and enables the functionality provided by the system and methods to span the information quality gap between slow software development tools that favor highly specified requirements, and agile models that prefer smaller, iterative, and quicker user story development. When combined with the numerous innovative algorithms, architectures, and techniques provided by the system and methods, the system and methods allow for the autonomous exploring of a software application supporting a computing system, generating, executing, and evaluating test cases therefrom, detecting defects and/or conflicts, and allowing a user or even a device to explore the results.

Based on the functionality provided by the system and methods, the system and methods can provide enhanced functionality and features for users and devices. For example, the system and accompanying methods may utilize, across information domains, a combination of correlation functions, machine learning techniques, and hypothesis testing with the application under evaluation to preferentially select the correct models and model components, while rejecting incorrect or inaccurate models and model components. Notably, the system and methods substantially reduce the effort required to generate quality models, tests, and tests results, and simultaneously improve the accuracy and coverage of the models. In certain embodiments, the system and methods may be utilized to generate software code to fix detected defects and/or conflicts in the application under evaluation, compose training video of actions performed by the system while exploring the application under evaluation, generate an autopilot that may enable a user or device to jump from one state of the application to another target state of the application, and automatically implement software extensions to the application under evaluation to incorporate additional functionality and features not necessarily contemplated originally for the application. Such enhancements and features provide for higher quality validation testing, increased autonomy, improved interactions with users or devices, improved user satisfaction, increased efficiencies, increased access to meaningful data, substantially-improved decision-making abilities, and increased ease-of-use.

To that end, in one embodiment according to the present disclosure, a system for autonomously testing an application of a computing system is disclosed. The system may include a memory that stores instructions and a processor that executes the instructions to perform operations conducted by the system. The system may perform an operation that includes obtaining data from one or more sources, and parsing the data obtained from the one or more sources to generate parsed data. The system may proceed to perform an operation that includes extracting one or more source concepts from the parsed data. Based on the one or more source concepts extracted from the parsed data, the system may perform an operation that includes updating one or more models from a set of agglomerated models to update the set of agglomerated models. The system may perform an operation that includes interacting with an application under evaluation by the system, such as via one or more inputs inputted into the application under evaluation while exploring the application under evaluation. Based on the interactions between the system and the application under evaluation, the system may receive one or more outputs from the application under evaluation. The system may perform an operation that includes updating, by utilizing the one or more outputs, the set of agglomerated models. In certain embodiments, the system may recursively update the set of agglomerated models over time as further data is obtained, as further interacting is conducted with the application under evaluation, as interacting is conducted with another application under evaluation, or a combination thereof. Notably, in this embodiment and for other embodiments described in the present disclosure, the operations conducted by the system may be performed in any desired order. For example, the interacting with the application under evaluation and the updating of the set of agglomerated models based on the interacting may be performed prior to parsing the data and extracting the source concepts to update the set of agglomerated models.

In another embodiment, a method for autonomously testing an application of a computing system is disclosed. The method may include utilizing a memory that stores instructions, and a processor that executes the instructions to perform the various functions of the method. In particular, the method may include obtaining data and information from one or more sources, such as internal data sources and external data sources. Additionally, the method may include parsing the data and information obtained from the one or more sources to generate parsed data, and extracting one or more source concepts from the parsed data. Based on the one or more source concepts extracted from the parsed data, the method may include generating a first model for inclusion in a set of agglomerated models. The method may then include interacting with an application under evaluation, such as via one or more inputs, and may then include receiving one or more outputs from the application under evaluation based on the interactions conducted with the application via the one or more inputs. The method may then include generating, by utilizing the one or more outputs, a second model for inclusion in the set of agglomerated models. In certain embodiments, the second model may be correlated with and/or include characteristics associated with the application under evaluation. In certain embodiments, the method may include recursively updating the set of agglomerated models over time as further data is obtained, as further interacting is conducted with the application under evaluation, as interacting is conducted with another application under evaluation, or a combination thereof. Notably, in this embodiment and for other embodiments described in the present disclosure, the operations of the method may be performed in any desired order. For example, the application under evaluation may initially be interacted with to generate the first model of the set of agglomerated models, and then data and source concepts may be parsed and extracted to update the first model generated based on the interaction with the application under evaluation, to update other models, or to generate new models for inclusion in the set of agglomerated models. In certain embodiments, the method may include executing, by utilizing the set of agglomerated models, one or more tests on the application under evaluation. Moreover, the method may include determining, based on executing the one or more tests, whether the application under evaluation operates in an expected manner and/or has any potential defects or conflicts.

According to yet another embodiment, a computer-readable device having instructions for autonomously testing an application of a computing system is provided. The computer instructions, which when loaded and executed by a processor, may cause the processor to perform operations including: parsing data obtained from a source to generate parsed data; extracting a source concept from the parsed data; generating, based on the source concept extracted from the parsed data, a first model for inclusion in a set of agglomerated models; interacting with an application under evaluation via an input; receiving an output from the application under evaluation based on the interacting conducted with the application via the input; generating, by utilizing the output, a second model for inclusion in the set of agglomerated models, wherein the second model is correlated with the application under evaluation; and recursively updating the set of agglomerated models over time as further data is obtained, as further interacting is conducted with the application under evaluation, as interacting is conducted with another application under evaluation, or a combination thereof.

These and other features of the systems and methods for autonomously testing a computing system are described in the following detailed description, drawings, and appended claims.

BRIEF DESCRIPTION OF THE DRAWINGS

FIG. 4 is a schematic diagram illustrating a user information page discovered by the system of FIG. 1.

FIG. 6 is a schematic diagram illustrating the user information page of FIG. 4, which has been augmented to include a suffix field based on the functionality provided by the system of FIG. 1.

FIG. 8 is a schematic diagram illustrating a user information page discovered using dynamic discovery on an application under evaluation by the system of FIG. 1.

DETAILED DESCRIPTION OF THE INVENTION

Figure 1:
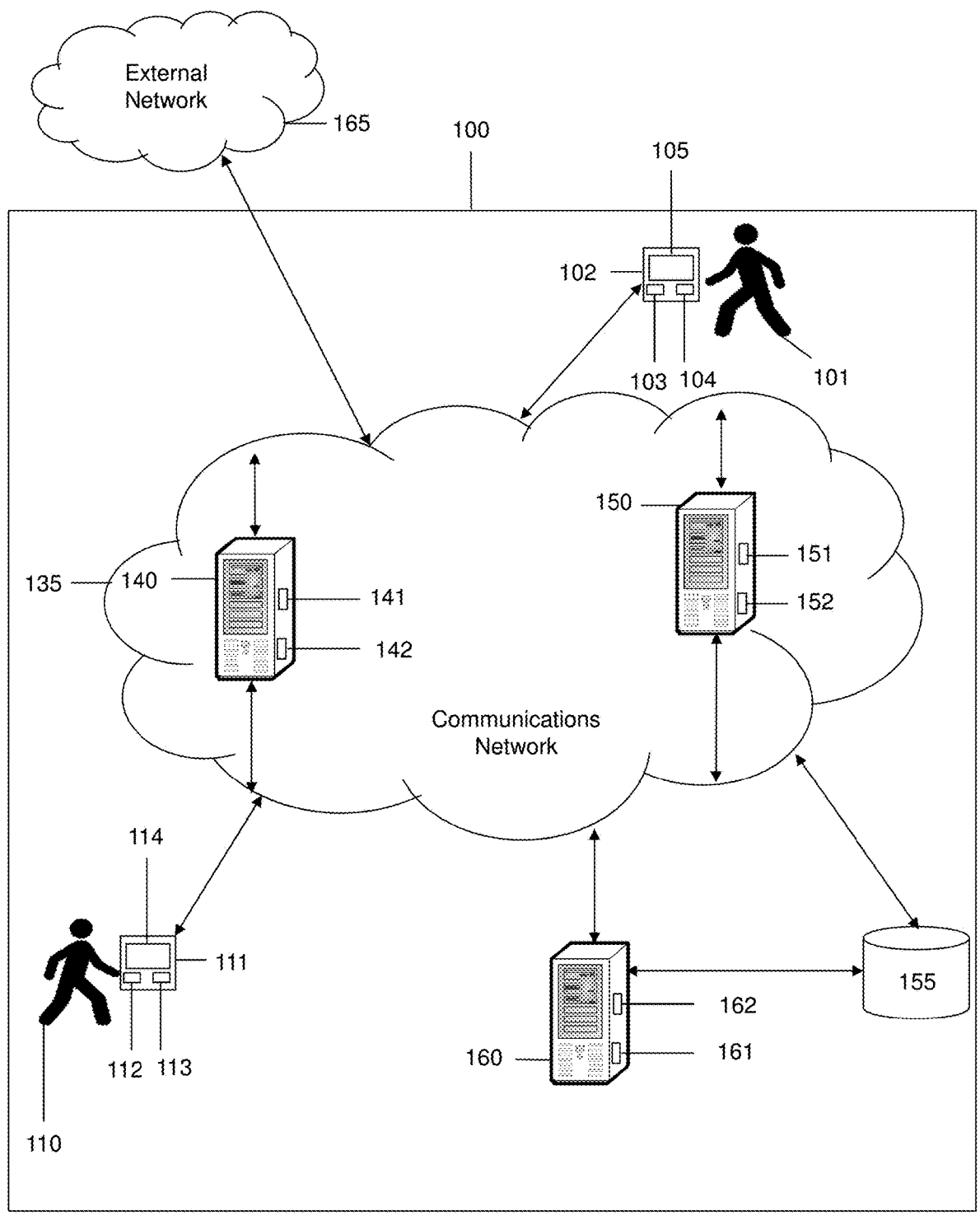
FIG. 1 is a schematic diagram of a system for autonomously testing a computing system according to an embodiment of the present disclosure.

A system 100 and accompanying methods 300, 700, 900 for autonomously constructing a verified and/or validated agglomerated model of a computing system, which may be utilized to facilitate the autonomous testing of the computing system are disclosed. In particular, the system 100 and accompanying methods enable the generation, execution, and evaluation of valid and useful automated test cases and the automated updating of the generation, execution, and evaluation mechanism to account for changes in the software of the computing system being tested. In contrast to existing technologies, the system 100 and accompanying methods 300, 700, 900 may recursively utilize an application under evaluation 230 to provide the context to connect disparate and fragmented sources of data, such as, but not limited to, user stories, requirements, documentation, domain knowledge, external information, test cases, computer software code, media content, and other data related to the desired functionality of the computing system supported by the application 230 (e.g. internal and external data sources 201, 202), into a complete and testable model. The system 100 and methods' 300, 700, 900 use of the discovered model associated with the application under evaluation 230 to connect the broad variety of internal and external information is unique and enables the functionality provided by the system 100 and methods 300, 700, 900 to span the information quality gap between slow software development tools that favor highly specified requirements, and agile models that prefer smaller, iterative, and quicker user story development. When combined with the numerous innovative algorithms, architectures, and techniques provided by the system 100 and methods 300, 700, 900, the system 100 and methods 300, 700, 900 allow for the autonomous exploring of a software application supporting a computing system, generating, executing, and evaluating test cases therefrom, detecting defects and/or conflicts, and allowing a user or even a device to explore and provide feedback relating to the results.

Based on the functionality provided by the system 100 and methods 300, 700, 900, the system 100 and methods 300, 700, 900 can provide enhanced functionality and features for users and devices. For example, the system 100 and accompanying methods 300, 700, 900 may utilize, across information domains, a combination of correlation functions, machine learning techniques, and hypothesis testing with the application under evaluation 230 to preferentially select the correct models and model components, while rejecting incorrect or inaccurate models and model components. Notably, the system 100 and methods 300, 700, 900 substantially reduce the effort required to generate quality models, tests, and tests results, and simultaneously improve the accuracy and coverage of the models. In certain embodiments, the system 100 and methods 300, 700, 900 may be utilized to generate software code to fix detected defects and/or conflicts in the application under evaluation 230, compose training video of actions performed by the system 100 while exploring the application under evaluation 230, generate autopilot functionality that may enable a user (e.g. first or second user 101, 110) or device to proceed automatically from one state of the application under evaluation 230 to another target state of the application under evaluation 230, and automatically implement software extensions to the application under evaluation 230 to incorporate additional functionality and features that may not have been originally included in or contemplated for the application 230. Such enhancements and features provide for higher quality testing, increased autonomy, improved interactions with users or devices, improved user satisfaction, increased efficiencies, increased access to meaningful data, substantially-improved decision-making abilities, and increased ease-of-use.

As shown in FIGS. 1-10, a system 100 and methods 300, 700, 900 for autonomously testing a computing system are disclosed. The system 100 may be configured to support, but is not limited to supporting, machine learning services, data and content services, computing applications and services, cloud computing services, internet services, satellite services, telephone services, software as a service (SaaS) applications and services, mobile applications and services, platform as a service (PaaS) applications and services, web services, client servers, and any other computing applications and services. The system 100 may include a first user 101, who may utilize a first user device 102 to access data, content, and applications, or to perform a variety of other tasks and functions. As an example, the first user 101 may utilize first user device 102 to access an application (e.g. a browser or a mobile application) executing on the first user device 102 that may be utilized to access web pages, data, and content associated with the system 100. In certain embodiments, the first user 101 may be any type of user that may potentially desire to test one or more software applications created by the first user 101, created for the first user 101, under the control of the first user 101, being modified by the first user 101, associated with the first user 101, or any combination thereof. For example, the first user 101 may have created a software application that has functional features that manage, modify, and store human resource information for employees of a business. Of course, the system 100 may include any number of users and any number of software applications that may be tested.

The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with various applications executing within the system 100, and to interact with the system 100 itself. In certain embodiments, the first user device 102 may include components that provide non-visual outputs. For example, the first user device 102 may include speakers, haptic components, tactile components, or other components, which may be utilized to generate non-visual outputs that may be perceived and/or experienced by the first user 101. In certain embodiments, the first user device 102 may be configured to not include interface 105. In such a scenario, for example, the system 100 may process timed events, such as syncing of files or conducting tasks, such as performing an automated paid-time-off (PTO) approval for a human resource-based process that would appear in the system 100 on the first user's 101 behalf. In certain embodiments, the first user device 102 may be a computer, a laptop, a tablet device, a phablet, a server, a mobile device, a smartphone, a smart watch, and/or any other type of computing device. Illustratively, the first user device 102 is shown as a mobile device in FIG. 1. The first user device 102 may also include a global positioning system (GPS), which may include a GPS receiver and any other necessary components for enabling GPS functionality, accelerometers, gyroscopes, sensors, and any other componentry suitable for a mobile device.

In addition to the first user 101, the system 100 may include a second user 110, who may utilize a second user device 111 to access data, content, and applications, or to perform a variety of other tasks and functions. As with the first user 101, in certain embodiments, the second user 110 may be any type of user that may potentially desire to test one or more software applications created by the second user 110, created for the second user 110, under the control of the second user 110, being modified by the second user 110, associated with the second user 110, or any combination thereof. In certain embodiments, the second user 110 may be a user that may desire to test an application created, controlled, and/or modified by the second user 110, the first user 101, any number of other users, or any combination thereof. For example, the application may include one or more workflow items that have been modified and/or supplemented by the first user 101, the second user 110, and/or other users. Much like the first user 101, the second user 110 may utilize second user device 111 to access an application (e.g. a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. a screen, a monitor, a graphical user interface, etc.) that may enable the second user 110 to interact with various applications executing on the second user device 111, to interact with various applications executing in the system 100, and to interact with the system 100. In certain embodiments, the second user device 111 may be a computer, a laptop, a tablet device, a phablet, a server, a mobile device, a smartphone, a smart watch, and/or any other type of computing device. Illustratively, the second user device 111 may be a computing device in FIG. 1. The second user device 111 may also include any of the componentry described for first user device 102.

In certain embodiments, the first user device 102 and the second user device 111 may have any number of software applications and/or application services stored and/or accessible thereon. For example, the first and second user devices 102, 111 may include human resource applications, artificial intelligence-based applications, machine learning-based applications, applications for facilitating the completion of tasks, cloud-based applications, search engine applications, natural language processing applications, database applications, algorithmic applications, phone-based applications, product-ordering applications, business applications, e-commerce applications, media streaming applications, content-based applications, database applications, gaming applications, internet-based applications, browser applications, mobile applications, service-based applications, productivity applications, video applications, music applications, social media applications, presentation applications, any other type of applications, any types of application services, or a combination thereof. In certain embodiments, the software applications may be applications under evaluation 230, which are described in further detail below. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for receiving demographic and preference information, applications for transforming data, applications for executing mathematical algorithms, applications for generating and transmitting electronic messages, applications for generating and transmitting various types of content, any other type of applications, or a combination thereof. In certain embodiments, the first and second user devices 102, 111 may include associated telephone numbers, internet protocol addresses, device identities, or any other identifiers to uniquely identify the first and second user devices 102, 111 and/or the first and second users 101, 110. In certain embodiments, location information corresponding to the first and second user devices 102, 111 may be obtained based on the internet protocol addresses, by receiving a signal from the first and second user devices 102, 111, or based on profile information corresponding to the first and second user devices 102, 111. In certain embodiments, the location information may be obtained by utilizing global positioning systems of the first and/or second user devices 102, 111.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. Illustratively, server 140 and server 150 are shown as being included within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140 and 150 may be utilized to perform the various operations and functions provided by the system 100, such as those requested by applications executing on the first and second user devices 102, 111. Additionally, the servers 140, 150 may be configured to perform various operations of the static model discovery module 200, the model change management module 204, the dynamic model discovery module 206, the evaluators 220, the data transformers 232, the controller 224, the learning engine 226, the application under evaluation 230, any other component and/or program of the system 100, or a combination thereof. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may store the output from any operation performed by the system 100, operations performed and output generated by the first and second user devices 102, 111, the servers 140, 150, 160, or any combination thereof. In certain embodiments, the database 155 may store a record of any and all information obtained from any data sources utilized by the system 100 to facilitate the operative functions of the system 100 and its components, store any information and data obtained from the internal and external data sources 201, 202, store the agglomerated models 208, store outputs generated by an application under evaluation 230, store feedback received from the first and second users 101, 110 and/or the first and second user devices 102, 111, store inputs entered into or utilized to interact with the application under evaluation 230, store software code 245 generated by the system 100, store reports 242 generated by the system 100, store analyses 243 generated by the system 100, store test results 246 generated by the system 100, store test data 247, store media training videos and media content, store any information generated and/or received by the system 100, any other data traversing the system 100, or any combination thereof. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, any devices in the system 100, any other device, any network, or any combination thereof.

The database 155 may also store information obtained from the system 100, store information associated with the first and second users 101, 110, store location information for the first and second user devices 102, 111 and/or first and second users 101, 110, store user profiles associated with the first and second users 101, 110, store device profiles associated with any device in the system 100, store communications traversing the system 100, store user preferences, store demographic information for the first and second users 101, 110, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The user profiles may include any type of information associated with an individual (e.g. first user 101 and/or second user 110), such as, but not limited to, a username, a password, contact information, demographic information, psychographic information, an identification of applications used or associated with the individual, any attributes of the individual, any other information, or a combination thereof. Device profiles may include any type of information associated with a device, such as, but not limited to, operating system information, hardware specifications, information about each component of the device (e.g. sensors, processors, memories, batteries, etc.), attributes of the device, any other information, or a combination thereof.

In certain embodiments, the database 155 may store algorithms facilitating the operation of the learning engine 226, the controller 224, the user interface 228, the agglomerated models 208, the evaluators 220, the data transformers 232, the static model discovery module 200, the model change management module 204, the dynamic model discovery module 206, the application under evaluation 230, the system 100 itself, any software application utilized by the system 100, or any combination thereof. In certain embodiments, the database 155 may be configured to store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

In certain embodiments, the system 100 may communicate and/or interact with an external network 165. In certain embodiments, the external network 165 may include any number of servers, databases, or other componentry, and, in certain embodiments, may be controlled by a service provider. The external network 165 may also include and be connected to a cloud-computing network, a phone network, a wireless network, an Ethernet network, a satellite network, a broadband network, a cellular network, a private network, a cable network, the Internet, an Internet protocol network, a content distribution network, a virtual private network, any network, or any combination thereof. In certain embodiments, the external network 165 may be accessed by the components of the system 100 to obtain data and information that may potentially be utilized to discover models that may be included in the agglomerated models 208. For example, the system 100 may receive (or access) user stories, requirements, documentation, domain knowledge, existing test cases, computer software code, other data and information, or a combination thereof, provided by the external network 165 to assist in the creation and/or modification of one or more models of the agglomerated models 208. In certain embodiments, one or more components within the external network 165 may request the system 100 to test one or more of applications associated with the external network 165. In response, the system 100 may test the one or more applications and provide outputs 240 generated based on the testing to the external network 165. In certain embodiments, one or more of the models of the agglomerated models 208 may be transmitted to the external network 165.

The system 100 may also include a software application or program, which may be configured to perform and support the operative functions of the system 100. In certain embodiments, the application may be a software program, a website, a mobile application, a software application, a software process, or a combination thereof, which may be made accessible to users utilizing one or more computing devices, such as first user device 102 and second user device 111. The application of the system 100 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. The application may include a custom user interface 228 that the first user 101 or second user 110 may interact with, such as by utilizing a web browser or other program executing on the first user device 102 or second user device 111. In certain embodiments, the software application may execute directly as an installed program on the first and/or second user devices 102, 111, such as a mobile application or a desktop application. In certain embodiments, the software application may execute directly on any combination of the servers 140, 150, 160.

The software application may include multiple programs and/or functions that execute within the software application and/or are accessible by the software application. For example, the software application may include an application that generates web content and pages that may be accessible to the first and/or second user devices 102, 111, any type of program, or any combination thereof. The application that generates web content and pages may be configured to generate a user interface 228 for the software application that is accessible and viewable by the first and second users 101, 110 when the software application is loaded and executed on the first and/or second computing devices 102, 111. The user interface 228 for the software application may display content for viewing by the first and/or second users 101, 110 via the first and/or second user devices 102, 111. Additionally, the user interface 228 may display functionality provided by the software application that enables the first and second users 101,110 and/or the first and second computing devices 102, 111 to interact with the software application and any modules supporting the software application's functionality. In certain embodiments, the software application may be configured to include the static model discovery module 200, the model change management module 204, the dynamic model discovery module 206, the agglomerated models 208, the evaluators 220, the data transformers 232, the learning engine 226, the controller 224, the user interface 228, any program or process in the system 100, or any combination thereof.

Figure 2:
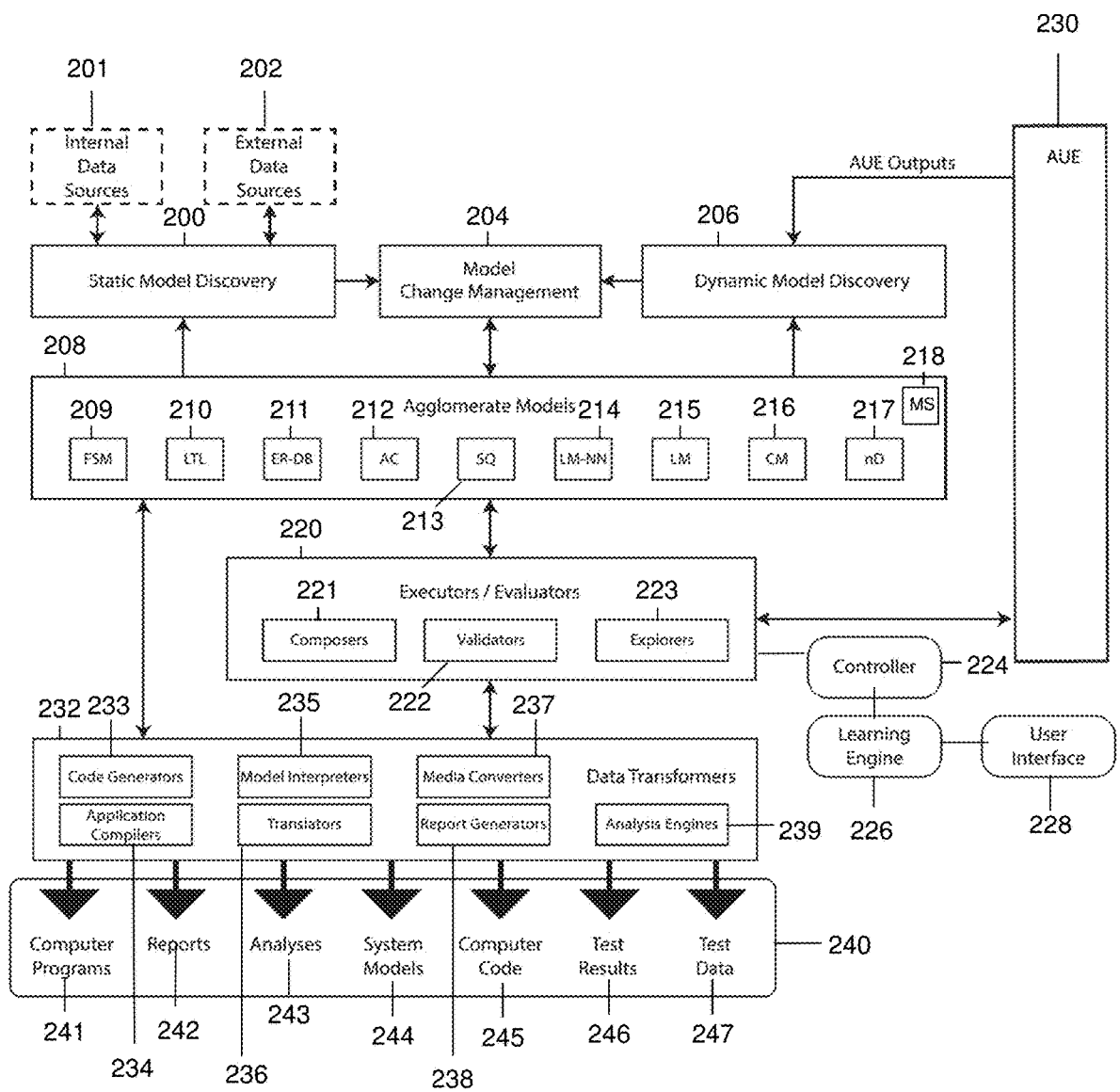
FIG. 2 is a schematic diagram illustrating various components of the system of FIG. 1, which facilitate the functional operation of the system.
Figure 3:
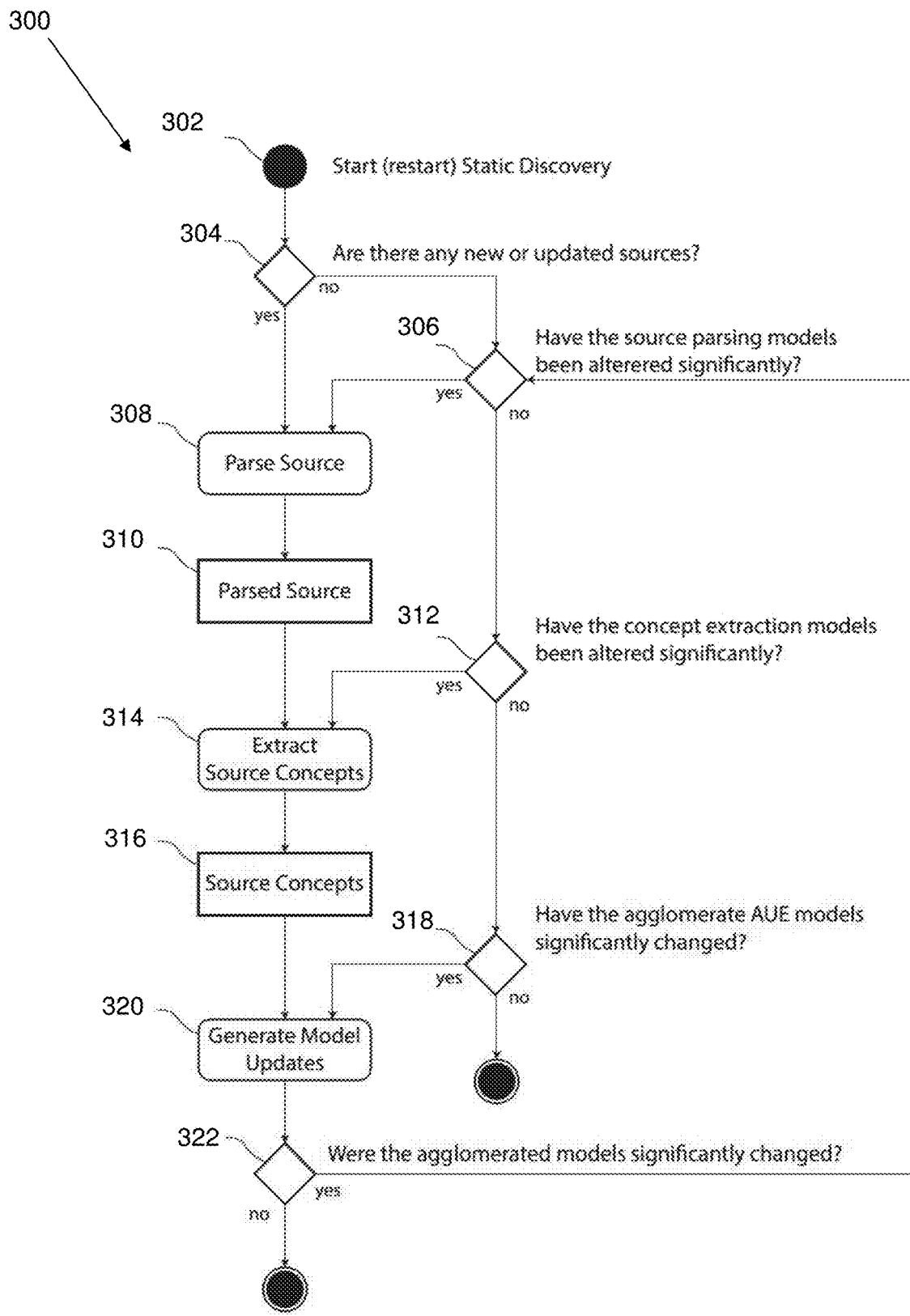
FIG. 3 is a flow diagram illustrating a sample method for conducting static discovery, which may be utilized to facilitate the autonomous testing of a computing system according to an embodiment of the present disclosure.
Figure 5:
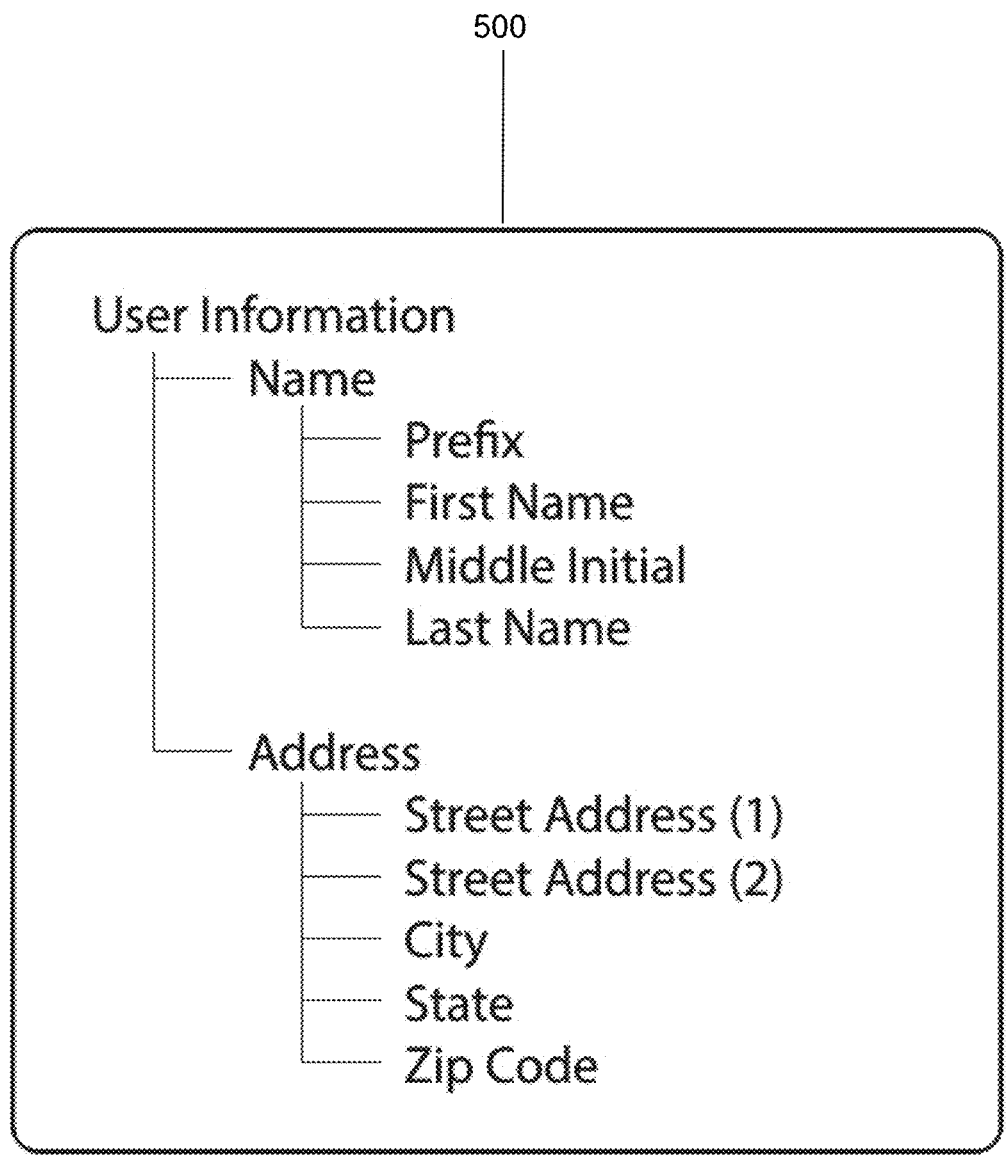
FIG. 5 is a schematic diagram illustrating an object hierarchy discovered from the discovered user information page illustrated in FIG. 4.

Referring now also to FIG. 2, various components of the system 100 are illustratively shown. In certain embodiments, the components illustrated in FIG. 2 may reside partially within communications network 135, entirely within communications network 135, entirely within the servers 140, 150, 160, partially within the servers 140, 150, 160, or any combination thereof. The system 100 may include one or more internal data sources 201. The internal data sources 201 may be data sources that contain data and information internal to the devices, processes, programs, and/or components of the system 100. The data and information included in the internal data sources 201 may include, but are not limited to, user stories, requirements, documentation, domain knowledge, existing test cases, computer software code, other data and information, or a combination thereof, which may be utilized to facilitate the creation of models and/or update models utilized by the system 100. User stories, for example, may comprise, but are not limited to, natural language descriptions of one or more features of a particular computing system or software application. Requirements may include, but are not limited to, descriptions of requirements for one or more features of a particular computing system or software application. In certain embodiments, user stories and requirements may include images, pictures, videos, sounds, and/or any type of media content that may be analyzed by one or more components of the system 100. For example, if a particular user story includes pictures, the pictures may be web screens (i.e. actual or proposed), the pictures may be of steps to take in a particularly process, pictures associated with a configuration of the system 100 or another system, etc. In certain embodiments, optical character recognition (OCR) or other image recognition techniques may be utilized to obtain text from pictures or media content, and may be utilized to facilitate the system's 100 understanding of the pictures or media content. Documentation may include, but is not limited to, digital documents containing information and data, which may be parsed to obtain data and information which may be of use by the system 100, such as to construct one or more of the agglomerated models 208. Domain knowledge may include, but is not limited to, knowledge pertaining to a computing environment in which a particular computing system or application operates, the rules governing the domain, knowledge obtained from devices and users in the domain, user workflows, configurations and constraints utilized in the development of a software application, data pipelines, domain specific acronyms, any other domain information, or a combination thereof. Test cases may be tests that the system 100 may utilize to validate and/or verify a software program, computing system, hardware, and/or any thing that may be tested by the system 100. In certain embodiments, tests may comprise natural language descriptions of steps for the system 100 to take and items to verify in order to conduct a particular test. Computer software code may comprise, but is not limited to, a set of instructions that may form a computer program that may be executed by the system 100.

In certain embodiments, the system 100 may also include one or more external data sources 202. The external data sources 202 may be data sources that contain data and information external to the devices, processes, programs, and/or components of the system 100. For example, the external data sources 202 may reside in networks outside of communications network 135 and may be not directly under the control of the system 100. The data and information included in the external data sources 202 may include, but are not limited to, user stories, requirements, documentation, domain knowledge, existing test cases, computer software code, web content, media content, data from external applications, outputs from devices external to the system 100, other data and information external to the system 100, or a combination thereof, which may be utilized to facilitate the creation of models and/or update models, such as the agglomerated models 208, which are discussed in further detail below. In certain embodiments, the data and information from the internal and external data sources 201, 202 (e.g. user stories, requirements, documentation, etc.) may be written and/or provided in natural language, in various natural language translations, and in various encodings. In certain embodiments, the data and information from the internal and data sources may be in provided in visual form (e.g. pictorially), in audible form, in source code, in pseudocode, in virtual form, any form, or any combination thereof. In certain embodiments, the data and information may be in release notes, help files, and/or in other types of documents.

The system 100 may include a static model discovery module 200, which may be a software module executing within a software application that conducts the operations of the system 100. In certain embodiments, the static model discovery module 200 may comprise a combination of hardware and software. The static model discovery module 200 may perform processes associated with discovering model information from the internal and external data sources 201, 202, which may be utilized to generate one or more models of the agglomerated models 208. The models may comprise representations of systems, programs, functions, processes, or any combination thereof, which may be utilized as a basis for comparison to a computing system, program, application, and/or function to be analyzed and/or tested by the system 100. Model data extracted by the static model discovery module 200 from static sources, such as the internal and external data sources 201, 202 may contribute to the efficient and dynamic discovery of models associated with an application under evaluation 230. In certain embodiments, the static model discovery module 200 may be configured to discover model information from the internal and external data sources 201, 202 that does not generally change based on interactions between the system 100 and a particular application under evaluation 230. In certain embodiments, new documents from the internal and external data sources 201, 202 may be inserted and utilized at any time. In certain embodiments, a new document may include a new version of a previous document utilized by the static model discovery module 200. As a result, while a particular document may be static, the number of documents may not be. The static model discovery module 200 may be configured to recursively and continuously enhance model information extracted from the internal and external data sources 201, 202 through the use of agglomerated models 208 that have been developed from earlier static and dynamic model discovery, executor/evaluator 220 testing of hypotheses (e.g. testing hypotheses relating to the expected functionality of an application under evaluation 230), the data transformers 232, the learning engine 226, and user inputs received from the first and/or second users 101, 110 via the first and/or second user devices 102, 111.

In certain embodiments, the system 100 may include a model change management module 204, which may be a software module executing within a software application that conducts the operations of the system 100. In certain embodiments, the model change management module 204 may comprise a combination of hardware and software. The model change management module 204 may perform processes associated with modifying and/or updating agglomerated models 208 based upon static and dynamic discovery processes conducted by the static model discovery module 200 and the dynamic model discovery module 206, which is discussed in further detail below. In certain embodiments, the model change management module 204 may modify one or more models of the agglomerated models 208 specifically when source concepts extracted from the static and dynamic discovery processes are of a threshold confidence level or are within a range of confidence levels. In certain embodiments, the module change management module 204 may be configured to resolve conflicts and manage issues that may arise from simultaneous and asynchronous static and dynamic discovery. For example, if information obtained from a static discovery process performed by the static model discovery module 200 conflicts with information obtained from a dynamic discovery process performed by the dynamic discovery module 206, the model change management module 204 may arbitrate which information should be utilized to update the agglomerated models 208, which information should be excluded from updates to the agglomerated models 208, and which information should be modified prior to inclusion into the agglomerated models 208.

As indicated above, the system 100 may include a dynamic model discovery module 206, which may be a software module executing within a software application that conducts the operations of the system 100. In certain embodiments, the dynamic model discovery module 206 may comprise a combination of hardware and software. The dynamic model discovery module 206 may perform processes associated with discovering model information from a specific application under evaluation 230 that is being tested, analyzed, and/or explored by the system 100. For example, the dynamic model discovery module 206 may discover model information used to generate new models for the agglomerated models 208 or update existing models in the agglomerated models 208 based on information and data gathered from outputs generated based on interactions between the system 100 and the application under evaluation 230 being tested by the system 100. In certain embodiments, the dynamic model discovery module 206 may represent the model extraction component of the system 100 associated with interactions and hypothesis testing driven by evaluators 220 on the application under evaluation 230. In certain embodiments, the dynamic model discovery module 206 may recursively and continuously enhance model information extracted from interactions between the system 100 and the application under evaluation 230 through the use of agglomerated models 208 developed from earlier static and dynamic model discovery (i.e. previously conducted static and dynamic model discovery), executor/evaluator 220 testing of hypotheses (e.g. testing hypotheses relating to the expected functionality of an application under evaluation 230), the data transformers 232, the learning engine 226, and user inputs received from the first and/or second users 101, 110 via the first and/or second user devices 102, 111.

The system 100 may include a set of agglomerated models 208. In certain embodiments, the models may comprise representations of systems, programs, functions, processes, information, data, or any combination thereof, which may be utilized as a basis for comparison to a computing system, program, application, and/or function to be analyzed, and/or explored, and/or tested by the system 100. For example, a model of the agglomerated models 208 may be utilized by a software application performing the operations of the system 100 to determine whether a particular application under evaluation 230 has any defects, conflicts, or other issues based on a comparison of the model to one or more functions, features, and/or states of the application under evaluation 230. The agglomerated models 208 may include models contributed to or generated from an application under evaluation 230, and may be utilized to interpret unstructured and incomplete information obtained from the internal data sources 201, external data sources 202, the application under evaluation 230, any other source, or any combination thereof. For example, the agglomerated models 208 may be utilized to interpret information from JIRAs, application programming interface documents, user stories, code comments, requirements, any other information, or any combination thereof. The agglomerated models 208 may be modified, updated, removed, replaced, or otherwise changed by the model change management module 204, and may be created based on information and data obtained from the internal and external data sources 201, 202 by the static discovery model module 200 and/or by information gathered from interactions by the system 100 with the application under evaluation 230 and/or other applications that have been already evaluated or will be evaluated in the future.

The agglomerated models 208 may include any type of model that may be utilized to perform the functionality provided by the system 100, and may represent data and information common to the operation of the system 100 across all applications under evaluation 230, within common domains of the applications under evaluation 230, and in representation of a single application under evaluation 230. For example, the agglomerated models 208 may include, but are not limited to, finite state machine (FSM) models 209, linear temporal logic (LTL) models 210, entity relationship/database (ER-DB) models 211, activity (AC) models 212, sequence (SQ) models 213, learning model/neural network (LM-NN) models 214, language (LM) models 215, conceptual (CM) models 216, n-Dimensional physical (nD) models 217, mathematical models (MS) 218, petri nets, any other models, or any combination thereof. In certain embodiments, the FSM model 209 may be an abstract, mathematical model of computation that may be in exactly one of a finite number of states at any given time. The FSM model 209 may be defined by a list of its states, its initial state or states, and the conditions for each transition. In certain embodiments, the LTL models 210 may comprise modal temporal logic models with modalities that refer to time. The ER-DB models 211 may be composed of entity types, which classify things of interest, and may specify relationships that may exist between instances of the entity types. In certain embodiments, entity relationships in the ER-DB models 211 may describe inter-related things of interest within a specific domain of knowledge. In certain embodiments, the ER-DB models 211 may represent the relations in a relational database. The AC models 212 may represent workflows of stepwise activities and actions with support for choice, iteration, and concurrency, such as with respect to activities conducted within an application being tested (e.g. application under evaluation 230). The SQ models 213 may be models that capture how objects in an application operate with one another and in what order.

The LM-NN models 214 may refer to a broad class of models that may be utilized in machine learning applications and/or artificial intelligence applications. In certain embodiments, the LM-NN models 214 may be trained based on internal and external feedback received by the system 100. Such feedback may relate to hypothesis testing, user feedback, and/or any other feedback received by the system 100. The LM models 215 may be probability distributions over sequences of words. For example, give a particular sequence of length m, a LM model 215 may assign a probability $P(w_1, \ldots w_m)$ to the whole sequence. In certain embodiments, the LM models 215 may refer to a variety of models built over text, such as part of speech tagging, lemmatizing, parsing, regular expression matching, annotating, summarizing, rewriting, along with other techniques. The CM models 216 may be representations of systems, which may be made of the composition of concepts that are utilized to help, know, understand and/or simulate an application or domain concept. The CM models 216 may also include relationships amongst the various concepts. The nD models 217 may be models, which represent the geometric relationship of modeled components, and, in the case of dynamic physical models, their interactions. In certain embodiments, the nD models 217 may be linear (i.e. one-dimensional), planar (i.e. two-dimensional), spatial (i.e. three-dimensional), and/or multi-dimensional (i.e. n-dimensional). The MS models 218 may be models, which are mathematical and/or statistical models. For example, a sample MS model 218 may be a Bayesian network model.

The system 100 may include a plurality of evaluators 220 (can also be executors 220), which may be one or more software modules executing within a software application that conducts the operations of the system 100. In certain embodiments, the evaluators 220 may comprise a combination of hardware and software. The evaluators 220 may comprise a plurality of processes that generate data and information based on their interactions with a given application under evaluation 230. In certain embodiments, there may be several types of evaluators 220. A first type of evaluator 220 may be a composer 221, which may be configured to execute a series of steps on the application under evaluation 230 to generate results, which may be composed into one or more outputs. In certain embodiments, the composer 221 may execute a set of steps on the application under evaluation 230, while capturing screenshots or screen outputs for conversion into a media content video by a data transformer 232 of the system 100. For example, the media content video may be a training video to assist a user with navigating through various features and functions of the application under evaluation 230. As another example, the media content may be a problem recreation and/or debugging video to assist a developer or tester to debug a problem with the application under evaluation 230. In this scenario, the problem creation and/or debugging video may document the steps to recreate the problem that occurred in the application under evaluation 230 so that the developer or tester may readily perceive and/or visualize how the problem occurred. As yet another example, the media content may be a test verification video for facilitating the historical verification of tests for auditing purposes. When the test verification video is being utilized for auditing the verification of tests that have been run, the test verification video may be a video that proves that a test was executed and that the test was passed by the application under evaluation 230. Notably, any other media content may be generated by the composer 221 for any suitable and/or desired purpose as well. In certain embodiments, a composer 221 may execute a series of steps on an application under evaluation 230, while capturing statistical information, which may be utilized by an analysis engine 239 to generate analyses 243. In certain embodiments, a composer 221 may be configured to observe inputs into the application under evaluation 230 and outputs generated from a validator 222 and/or explorer 223 and generate composed output results. A second type of evaluator 220 is a validator 222, which may be configured to execute a series of steps on the application under evaluation 230 test-modeled functionality and/or to evaluate hypotheses generated by the system 100 as they relate to the functionality of the application under evaluation 230. The validators 222 may assist in developing high confidence agglomerated models 208 based on the series of steps executed or otherwise. In certain embodiments, the system 100 may require zero or more validators 222 to operate because trivial or special use cases exist where sufficient model confidence may be obtained without utilizing the functionality of the validators 222. A third type of evaluator 220 is an explorer 223, which may be configured to execute a series of steps on an application under evaluation 230 to dynamically explore and model the application under evaluation 230 in conjunction with the dynamic model discovery module 206. In certain embodiments, the explorers 223 may assist in the discovery and creation of models corresponding to the application under evaluation 230, correlating with one or more functions and/or features of the application under evaluation, or a combination thereof.

The system 100 may also include a controller 224, which may be software, hardware, or a combination thereof. The controller 224 may be configured to control the application, hardware, and/or components of the system 100 that facilitate the functionality of the system 100. In certain embodiments, the controller 224 may govern the high-level behavior of the system 100 itself, and may be configured to start the operation of the system 100, start subsystems of the system 100, and/or stop the operation of the system 100 and subsystems. In certain embodiments, the controller 224 may manage the configuration of the system 100, along with the configuration of the application under evaluation 230. The controller 224 may also direct the flow of control or flow of data between the various modules of the system 100, such as, but not limited to, the static model discovery module 200, the model change management module 204, the dynamic model discovery module 206, the evaluators 220, the data transformers 232, any other module or software in the system 100, or any combination thereof. In certain embodiments, the controller 224 may allocate and direct computing resources within the system 100. For example, the controller 224 may allocate and direct computing resources such as, but not limited to, memory (e.g. random-access memory), processors, and/or network resources. In certain embodiments, the controller 224 may also allocate and direct virtual computing resources, such as, but not limited to, containers, virtual machines, virtual processors, virtual memory (e.g. virtual random-access memory), cloud resources, virtual networks, other virtual resources, or any combination thereof. In certain embodiments, the controller 224 may direct the priority, the level of parallelism, and/or redundancy of various components in the system 100. In further embodiments, the controller 224 may control the backup and recovery of data and information stored and/or traversing the system 100. In still further embodiments, the controller 224 may be configured to control the operation of any program, hardware, and/or system associated with the system 100.

In addition to the controller 224, the system 100 may also include a learning engine 226. The learning engine 226 may be software, hardware, or a combination thereof, and may be supported by any suitable machine learning and/or artificial intelligence algorithms. The learning engine 226 may be a system that determines patterns and/or associations in behaviors or objects, such as, but not limited to, behaviors and/or objects of an application under evaluation 230 that is being analyzed and/or tested by the system 100. The learning engine 226 may allow for improved efficiency and accuracy of the system 100, while enabling more advanced static model discovery modules 200, evaluator 220 modules, and/or data transformer 232 modules. In certain embodiments, the learning engine 226 may allow for supervised learning, which may be supported through the user interface 228 that may be accessed and interacted with by the first user 101, the second user 110, and/or n-other users. For example, the learning engine 226 may receive inputs from the first and/or second users 101, 110 that endorse one or more models, test validation, perform sentence tagging in documents, etc. that may be utilized to enhance the agglomerated models 208, the operation of the system 100, and the knowledge base of the system 100. Additionally, the learning engine 226 may support unsupervised learning by automatically feeding validated test results from the evaluators 220 and statistical, performance-based, evaluator 220 results back through the system 100 as they are generated. In certain embodiments, the learning engine 226 may be configured to associate confidences or confidence levels with determined patterns and/or associations determined by the learning engine 226. Notably, the learning engine 226 may increase the confidence value of a particular pattern as the pattern is detected more frequently by the learning engine 226 over time, or lower the confidence value of the particular pattern if the pattern is contradicted in some regard or is not detected frequently over time. In certain embodiments, the confidence values may range from 0.0 to 1.0, however, any suitable scale may be utilized according to the present disclosure. In certain embodiments, the first user 101 and/or the second user 110 may be allowed to provide inputs via the first and/or second user devices 102, 111 to directly alter the confidence values. In certain embodiments, the first user 101 and/or the second user 110 may alter the confidence values via user interface 228 of the software application that performs the operative functions of the system 100. The user interface 228 may be made accessible to the first and/or second user devices 102, 111.

A sample use-case scenario may be utilized to illustrate how the first user 101 may adjust a confidence value. In this use-case scenario, the learning engine 226 may determine that each employee having an account being generated by an application under evaluation 230 has a phone number with a 0.95 confidence value. The first user 101 may review the learning engine's 226 determination and verify that the determination is accurate via an input transmitted via the first user device 102. Based on the first user's 101 verification, the learning engine 226 may increase the confidence value from 0.95 to 0.99 or even to 1.00 for an employee having a phone number. As another use-case scenario, the system 100 may determine from information gathered from the static model discovery module 200 that a user should not be able to change their date of birth in a user account created by an application. This determination, however, may be deemed as inaccurate or wrong by the first user 101. In this scenario, the learning engine 226 may alter the confidence value attributed to a user not being able to change the date of birth down to 0.01 or even to 0.00 from a higher confidence value originally determined by the learning engine 226. In contrast, the confidence value attribute to the user being able to change the date of birth may be increased by a certain amount by the learning engine 226.

The software application that facilitates the functional operations of the system 100 may include a user interface 228. The user interface 228 may be a graphical user interface, which may allow the first and/or second users 101, 110 and devices to interact with the software application performing the operations of the system 100. In certain embodiments, the user interface 228 may be a text-based terminal/command interface. The user interface 228 of the application may have both visual and auditory elements as output, and may be configured to receive keyboard inputs, mouse inputs, microphone inputs, screen inputs (e.g. touchscreen inputs) any type of inputs, or any combination thereof, from a user and/or device interacting with the user interface 228. In certain embodiments, the user interface 228 may be adapted to receive inputs and/or send outputs via user interface elements specifically configured for people with disabilities or challenging circumstances. In certain embodiments, an application programming interface (API) or software development kit (SDK) may be utilized for remote computers to connect with the system 100, and may input or output information as needed.

The system 100 may be configured to access, test, and/or interact with one or more applications under evaluation 230. An application under evaluation 230 may be a software application that the first and/or second user 101, 110 may wish to analyze and/or test by utilizing the system 100. In certain embodiments, instead of a user requesting that an application under evaluation 230 be analyzed or tested, a device, robot, and/or program may request the analyzing and testing of the application under evaluation 230. Based on interactions between the system 100 and an application under evaluation 230, information and data may be obtained to facilitate the creation of one or more models of the agglomerated models 208, the updating of one or more models of the agglomerated models 208, the verification of one or more models of the agglomerated models 208, or any combination thereof. In certain embodiments, the applications under evaluation 230 may be accessed, tested, and explored by utilizing the evaluators 220, which include the composers 221, validators 222, and explorers 223.

In certain embodiments, the system 100 may include a plurality of data transformers 232. In certain embodiments, the data transformers 232 may be software, hardware, or a combination thereof. The data transformers 232 may be configured to take one or more inputs, such as, but not limited to, the agglomerated models 208 and information and data obtained from the evaluators 220 to generate a useful output, such as by manipulating the data and information in the inputs. In certain embodiments, the system 100 may include any number of data transformers 232, which may include code generators 233, application compilers 234, model interpreters 235, translators 236, media converters 237, report generators 238, and analysis engines 239. The code generators 233 may be configured to access model inputs from the agglomerated models 208 and one or more objectives obtained from the evaluators 220, other data transformers 232, or even the code generators 233 themselves to create software code that satisfies the objectives. In certain embodiments, the software code generated by the code generators 233 may be utilized to fix a defect detected by the system 100 in an application under evaluation 230. In certain embodiments, the generated software code may be utilized to add, change, and/or remove functionality of the application under evaluation 230. In certain embodiments, the generated software code may be utilized to test or exercise the application under evaluation 230. In further embodiments, the generated code may be internal to the application under evaluation 230 or external to the application under evaluation 230, and the generated code may be related to the application under evaluation 230 or the generated code may benefit other software applications outside of the application under evaluation 230, such as applications that support the environment of the application under evaluation 230 (e.g. cloud programs, SaaS, operating systems, related applications, etc.). In certain embodiments, the generated code may be written and/or compiled by utilizing any suitable programming language, such as, but not limited to C, C++, Java, Python, and/or other language. In certain embodiments, the generated code may be generated at a high level, such as through the use of scripting languages, or low level, such as through the use of assembler/assembly languages. In certain embodiments, the generated code may be software that may enhance, replace, and/or modify the software application (including any modules) supporting the operation of the system 100. For example, the generated code may be utilized to update a start-up script based on execution patterns of the application under evaluation 230 or usage patterns of users of the application under evaluation 230.

The application compilers 234 may utilize outputs from the code generators 233 and compile the generated code into one or more computer applications/programs 241. In certain embodiments, the application compilers 234 may utilize inputs from the agglomerated models 208 and data from the evaluators 220, and incorporate such inputs and data when compiling software code. Inputs may also include compiler options, such as, but not limited to optimizations, performance goals, goals relating to the operation of the application under evaluation 230, configuration options, etc. The application compilers 234 may include target models (i.e. selected) of the agglomerated models 208 to improve directly or indirectly, such as by improving the functional features of the application under evaluation 230. The model interpreters 235 may be utilized in interpreting the models in the agglomerated models 208. In certain embodiments, the model interpreters 235 may comprise software, hardware, or a combination of hardware and software. An example use-case scenario of using a model interpreter 235 involves the use of a LM model 215. For the LM model 215, there may need to be a model interpreter 235, which is configured to understand the LM model 215 and how it relates to the application under evaluation 230, or how the application under evaluation 230 is understood by the evaluators 220. For example, the LM model 215 may tag or mark parts of speech or concepts found in paragraphs of text obtained from the internal or external data sources 201, 202, and the model interpreter 235 may be configured to comprehend the parts of speech as it pertains to the application under evaluation 230. In this case, the comprehension by the model interpreter 235 may comprise understanding an application page title, an application widget (e.g. text box, menu, pull down menu, radio button, etc.), an application user or role, an application message (e.g. alerts, emails, highlighted text, etc.), and/or any action in the application under evaluation 230 (e.g. create, read, update, delete, navigate, click, select, choose, enter, etc.)

The translators 236 may be software, hardware, or a combination thereof, and may take a model of the agglomerated models 208 or outputs from the evaluators 220, and convert them into a form that is more useful for a given task. As an example, a translator 236 may take a FSM model 209 and convert the FSM model 209 from a representation in a database 155 to a graphical representation, which may be more readily understood by the first or second user 101, 110. For example, the states of the FSM model 209 may be represented by circles or tiles, which further represent or illustrate a portion of the specific application that they represent. In certain embodiments, transitions between states may be shown as lines, which may have effects, which may imply characteristics of the transitions. Such effects may include adjusting thickness of a line to show popularity of use, a number of paths, complexity, or any other attribute. As another example, a translator 236 may take a LM model 215 or output from the evaluators 220, and convert them from English language to another language, such as Chinese or any other desired language, and vice versa. The translators 236 may also be utilized to translate from one encoding to a second encoding, such as from ASCII to Unicode. As yet another example, the translators 236 may take a SQL database (e.g. database 155) and convert it to a NOSQL database. Any translated information, programs, content, or output from the translators 236 may be fed into the agglomerated models 208, the evaluators 220, and/or the outputs 240 for further use by the system 100.

The media converters 237 of the system 100 may be configured to utilize outputs of the evaluators 220 and the agglomerated models 208 and convert them from a first form to a second form. In certain embodiments, the media converters 237 may be software, hardware, or a combination thereof. As an example of the operation of the media converters 237, the media converters 237 may take a textual description of the application under evaluation's 230 actions and steps, and convert them into listenable audio, which may be particularly useful to those with visual impairment. For those with hearing impairment, the media converters 237 could convert audio into text or images, which may be utilized for closed caption purposes in a presentation. The report generators 238 of the system 100 may be hardware, software, or a combination thereof, and may be utilized to create reports 242 based on the outputs of models of the agglomerated models 208, outputs from the evaluators 220, outputs from the data transformers 232, outputs from the application under evaluation 230, along with any other outputs received by the system 100. As an example, the report generators 238 may generate reports 242 that include the results of test cases executed on the application under evaluation 230 by the system 100. In certain embodiments, the outputs may simplify, summarize, and/or otherwise organize the data in the outputs. The analysis engines 239 may also comprise hardware, software, or a combination thereof. The analysis engines 239 may analyze the outputs of the agglomerated models 208, the outputs of the evaluators 220, the outputs of the data transformers 232 and any other outputs received by the system 100 to take an intelligent action. An intelligent action may include identifying a noteworthy condition based on the outputs analyzed, for example. The condition may be output in an analysis 243, and, in certain embodiments, the condition may be a defect detected in a test result 246. In certain embodiments, the condition may be based on the performance, popularity, complexity, or any other metric of a state or transition of a FSM model 209.

In addition to the functionality provided by the various components of the system 100 described above, the system 100 may also generate a variety of outputs 240 based on use of the components. The outputs 240 generated by the system 100 may include, but are not limited to, computer programs 241, reports 242, analyses 243, system models 244, computer code 245, test results 246, and test data 247. The computer programs 241 may be sets of instructions, which may be executed by various components of the system 100 to perform one or more tasks. As described above, the application compilers 234 may utilize outputs from the code generators 233 and compile the generated code into one or more computer applications/programs 241. The created computer programs 241 may be utilized to supplement functionality of an application under evaluation 230, integrated into an application under evaluation 230, replace functionality of the application under evaluation 230, modify functionality of the application under evaluation 230, or any combination thereof. The reports 242 may be generated by the report generators 238 of the system 100, and the reports 242 may be generated based on the outputs of models of the agglomerated models 208, outputs from the evaluators 220, outputs from the data transformers 232 outputs from the application under evaluation 230, along with any other outputs received by the system 100. The reports 242 may combine information from the outputs in a visual format, audio format, a format understandable by those with hearing and visual impairments, or any combination thereof. As an example, a report 242 may visually show all the successful paths that the evaluators 220 were able to take while testing the application under evaluation 230, along with any defects and/or any potential conflicts detected while exploring the functionality of the application under evaluation 230. Of course, any type of report 242 may be generated by the system 100, and a report 242 may include any information generated, received, stored, transmitted, and/or manipulated by the system 100.

The analyses 243 may be a type of output 240 of the system 100, which may identify a noteworthy condition, such as a condition associated with an application under evaluation 230 (e.g. a defect or conflict), a condition associated with one or more components of the system 100, any type of condition, or any combination thereof. The condition may be output in the analysis 243, and may be generated by the analysis engines 239. The system models 244 that may be output by the system 100 may comprise an architecture and/or behavior of the system 100 or any other system that the system 100 interacts with. For example, a system model 244 may be a model that describes an architecture or behavior of the application under evaluation 230, functions and products related to the application under evaluation 230, a computing environment associated with the application under evaluation 230, and/or an application related to the application under evaluation 230. In certain embodiments, the system model 244 may be one or more models from the agglomerated models 208. The computer code 245 may be an output 240 that comprises instructions for executing a task, such as on a processor of one or more of the components of the system 100. The computer code 245 may be generated by the code generators 233 and may be compiled by the application compilers 234. In certain embodiments, the computer code 245 may be obtained from the agglomerated models 208, the evaluators 220, and/or the data transformers 232. In certain embodiments, the computer code 245 may be utilized to supplement functionality of an application under evaluation 230, integrated into an application under evaluation 230, replace functionality of the application under evaluation 230, modify functionality of the application under evaluation 230, modify functionality of modules and applications supporting the functionality of the system 100, or any combination thereof.

The test results 246 of the outputs 240 may be results of executing various software, hardware, and/or application tests on components of the system 100, the application under evaluation 230, or any combination thereof. The tests results 246 may be obtained based on tests and/or analyses conducted by the validators 222, the analysis engines 239, any of the evaluators 220, and/or any of the data transformers 232. In certain embodiments, the test results 246 may include information relating to a test, such as, but not limited to, an identifier identifying the type of test executed, inputs inputted into the test, outputs generated from the test, performance metrics associated with the test, or a combination thereof. In certain embodiments, the test results 246 may indicate whether the test was successful or a failure. If a failure occurred, additional data and metadata may be included with the test results 246, such as, but not limited to, call stacks, offsets within computer programs, source code, addresses of objects (e.g. objects within the application under evaluation or other components being tested), actual objects, memory dumps, screenshots, and/or any other information that may assist with failure remediation and/or analysis. Test data 247 may be any information that pertains to the assessment of software, hardware, applications, or any combination thereof, that the system 100 interacts with. In certain embodiments test data 247 may include inputs and outputs of tests, executable and/or manual test steps, expected results of tests, actual results of tests, functional results of tests, performance results of tests, or any combination thereof. In certain embodiments, test data 247 may include metadata describing the tests, such as, but not limited to, how many tests exist, the priority or ordering of tests to be utilized, computer resources (e.g. memory resources, processing resources, etc.) assigned to and utilized for executing certain tests, instructions or media content (e.g. pictures, video, audio, etc.) describing the application under evaluation 230, any other information, or a combination thereof.

Operatively, the system 100 may operate according to the following exemplary use-case scenarios. Of course, the system 100 may be utilized for any suitable use-case scenario and the scenarios described below are merely for illustration purposes. The use-case scenarios described herein are utilized to illustrate the synergistic and reinforcing relationship between static and dynamic discovery conducted by the system 100, the use and centrality of the agglomerated models 208 in achieving the functionality of the system 100, and further insight into the conceptual framework for interacting with an application under evaluation 230. In a first use-case scenario and referring now also FIG. 3, a method 300 for conducting static discovery from a user story, such as a JIRA story, is shown. This use-case may be utilized to illustrate how the system 100 builds useful model information from incomplete requirements statements, which may be included in the user story. At step 302, the method 300 may include initiating static discovery or restarting static discovery (e.g. if a static discovery session has already been completed) periodically, such as if new source data and information becomes available from the internal and/or external data sources 201, 202. In certain embodiments, the static discovery may be initiated or restarted by utilizing the controller 224 of the system 100. The static discovery may be conducted by the utilizing the static model discovery module 200 and other components of the system 100. At step 304, the method 300 may include determining if new or updated sources and/or new or updated data and information from the internal and external data sources 201, 202 exist.

If, at step 304, there are determined to not be any new or updated internal and/or external data sources 201, 202, the method 300 may proceed to step 306, which may include determining if source parsing models of the system 100 have been altered significantly. The term significantly in this example may mean that a threshold amount of information in a source parsing model has changed, that core features of the source parsing models have changed, or any combination thereof. Such source parsing models may be utilized to facilitate the parsing process and may be included within the agglomerated models 208 and/or within the static model discovery module 200. In certain embodiments, the source parsing models may have been updated or altered significantly based on dynamic discovery model updates performed by the model change management module 204, which may have received dynamic model information from the dynamic model discovery module 206 (the dynamic discovery process conducted by the system 100 is discussed in further detail later in this disclosure). If the source parsing models have been altered significantly, the method 300 may proceed from step 306 to step 308, which may include reparsing previously processed and parsed data and information 310 (e.g. a user story) to generate reparsed data and information 310. If, however, the source parsing models have not been altered significantly, the method 300 may proceed from step 306 to step 312, which may include determining if concept extraction models of the system 100 have been altered significantly. Concept extraction models may be utilized to extract concepts from parsed data and information 310, and may be included within the agglomerated models 208 and/or within the static model discovery module 200. If, at step 312, the concept extraction models of the system 100 have been altered significantly (e.g. a threshold amount of information in concept extraction model has changed, core features of the concept extraction models have changed, or any combination thereof), the method 300 may include proceeding to step 314 and extracting one or more source concepts 316 from the parsed data and information 310 by utilizing the significantly changed concept extraction models. In certain embodiments, as the extraction of model source concepts 316 from any given source 201, 202 may be dependent on the agglomerated models 208 resulting from other static and dynamic sources, the system 100 may attempt to extract source concepts 316 from previously parsed data and information 310 one or more times. The extracted source concepts 316 may then be utilized to update one or more models of the agglomerated models 208 at step 320. The method 300 may then proceed to step 322 to determine if the agglomerated models 208 have been significantly changed based on the updates. If the updates to the agglomerated models 208 do not comprise a significant change to the agglomerated models 208, the method 300 may end, or, in the alternative, may restart the static discovery process back at step 302. If, however, the updates to the agglomerated models 208 do comprise a significant change, the method 300 may go back to step 306 and repeat the steps of the method 300 as necessary. If, however, at step 312, the concept extraction models have not been altered significantly, the method 300 may include proceeding from directly from step 312 to step 318. At step 318, the method 300 may include determining if models of the agglomerated models 208 corresponding to an application under evaluation 230 being analyzed by the system 100 have changed significantly. The agglomerated models 208 corresponding to the application under evaluation 230 may have changed significantly if a threshold number of such models have changed, if a threshold amount of information within one or more of such models has changed, if a statistic confidence associated with one or more models changes by a threshold amount, if core features of one or more of such models has changed, if a selected portion of one or more of such models has changed, or any combination thereof. If the agglomerated models 208 corresponding to the application under evaluation 230 have not changed significantly, the method 300 may end, or, in the alternative, the method 300 may restart the static discovery process back at step 302. If, however, the agglomerated models 208 corresponding to the application under evaluation 230 have changed significantly, the method 300 may proceed to step 320, which may include updating one or more of the agglomerated models 208 based on the changes to the agglomerated models 208 corresponding to the application under evaluation 230. The method 300 may then proceed to step 322 to determine if the agglomerated models 208 have been significantly changed based on the updates. If the updates to the agglomerated models 208 do not comprise a significant change to the agglomerated models 208, the method 300 may end, or, in the alternative, restart the static discovery process back at step 302. If, however, the updates to the agglomerated models 208 do comprise a significant change, the method 300 may go back to step 306 and repeat the steps of the method 300 as necessary.

If, however, at step 304, there are determined to be new or updated internal and/or external data sources 201, 202 (e.g. a user story in this case), the method 300 may proceed to step 308, which may include parsing the data and information from the new or updated internal and/or external data sources 201, 202 to generate parsed data and information 310 from the sources 201, 202. The parsing of the data and information may be facilitated by utilizing one or more source parsing models, which may or may not be included with the agglomerated models 208. As an example, the system 100 may parse the new user story (e.g. JIRA story) provided by an internal data source 201 of the system 100. In certain embodiments, the system 100 may utilize a variety of parsing tools, individually or in combination, to parse the new user story, which may include rule-based, natural language processing, and/or deep learning tools and techniques. In certain embodiments, the parsed data and information 310 outputted via step 308 may depend on learned or partially-learned models, such as, but not limited to, LM models 215 and neural networks (e.g. LM-NN model 214). The parsed data and information 310 may be stored in database 155 for future use or for additional processing as an agglomerated model 208. In this example use-case scenario, the JIRA story may include the following sentence: "I am a user and I want to be able to enter multiple suffixes on the user information page." The system 100 may parse this sentence from the JIRA story for further use by the system 100 during step 308.

Once the parsed data and information 310 from the internal and external sources 201, 202 is obtained, the method 300 may proceed to step 314. At step 314, the method 300 may include extracting one or more source concepts 316 from the parsed data and information 310. As indicated above, the extracting of the one or more source concepts 316 may be facilitated and/or performed by the utilizing the static model discovery module 200 of the system 100 and/or one or more concept extraction models. In certain embodiments, concept extraction models may reside or persist within the static model discovery module 200 and/or in the agglomerated models 208. Using the example above, the system 100 may utilize a combination of rule-based natural language processing and/or convolutional neural network functionality supplied by the system 100 to extract source concepts 316 from the sentence. For example, the subject ("I") of the parsed sentence, the action ("enter"), the object ("multiple suffixes"), and the page reference ("user information page") may be source concepts 316 extracted by the system 100 from the parsed sentence of the user story. In certain embodiments, the source concepts 316 may be extracted and/or processed by utilizing any number of techniques, such as, but not limited to, explicitly-coded algorithms, external tools such as natural language processing services, image recognition services, translation services, voice recognition services, any other services, or any combination thereof. In certain embodiments, the system 100 may utilized learned techniques that may be aided by internally represented agglomerated models 208 to include deep learning and machine learning networks. In certain embodiments, the extracted source concepts 316 may be stored, such as in database 155, for later or repeated processing and reference. The extracted source concepts 316 may then be utilized to update one or more models of the agglomerated models 208 at step 320 (e.g. using the extracted subject, action, object, and page reference in the example above). The method 300 may then proceed to step 322 to determine if the agglomerated models 208 have been significantly changed based on the updates. If the updates to the agglomerated models 208 do not comprise a significant change to the agglomerated models 208, the method 300 may end, or, in the alternative, may restart the static discovery process back at step 302. If, however, the updates to the agglomerated models 208 do comprise a significant change, the method 300 may go to step 306 and repeat the steps of the method 300 as necessary.

In certain embodiments and on certain occasions, source concepts 316 may not be extractable from certain data and information 310 without the appropriate agglomerated model context being extracted beforehand from other static and dynamic sources of data and information previously obtained by the system 100. The recursive use of statically and dynamically extracted models to develop more robust and complete agglomerated models 208 is a novel feature of the system 100. This process is further described as follows in relation to the following example requirement from a user story as previously discussed above: "I am a user and I want to be able to enter multiple suffixes on the user information page." For this use-case example, the following precondition may exist: As a result of a dynamic model discovery process conducted by the dynamic model discovery module 206 prior to, simultaneously with, or after the initial static discovery of the requirement (e.g. discovery of a requirement from a JIRA story), the system 100 may have developed data, FSM models 209, other models, models of an application under evaluation 230, or a combination thereof. For example, the system 100 may have discovered a user information page 400 from an application under evaluation 230, such as is shown in FIG. 4. The application under evaluation 230 may be an application that allows users to save and enter biographical and other information about themselves, such as via the user information page 400. The user information page 400 may allow the first user 101 and/or second user 110 to enter their name, components of which may include a prefix, first name, middle name, and last name. For example, the first user 101 may enter the components of his name via one or more separate text fields, as shown in FIG. 4. Additionally, the system 100 during its discovery processes may have discovered address fields in the user information page 400, which may include two fields for street address, one field for the city, one field for state, and one field for zip code. Furthermore, the system 100 may have discovered two actionable buttons on the user information page 400, namely a save button for saving the information input into the fields and a cancel button to cancel input of information into the user information page 400. The dynamically discovered models and FSM models 209 enable the system 100 to deterministically navigate to, explore, and validate the discovered models. Based on the positional information of the fields on the user information page 400, the document object model (DOM) structure of the user information page 400 and with the possible support of static model information obtained via method 300, the system 100 can determine that the user information page 400 consists of two complex objects, Name and Address, and the relationship of the individual fields on the user information page 400 to these two objects. For example and referring now also to FIG. 5, an object hierarchy 500 for the Name and Address objects discovered form the dynamically discovered user information page 400 is shown.

When the dynamically discovered model information that is obtained from the application under evaluation 230 via the user information page 400 and when the parsed source (i.e. the parsed user story described above) is available, the system 100 may attempt to extract additional conceptual information from the parsed requirement from the user story. The static model discovery process provided via method 300 is utilized to match parsed objects to other model objects already represented in the agglomerated models 208. In this specific example, the system 100 may utilize word matching techniques to identify that the reference to the user information page in the parsed requirement from the user story is referencing the dynamically discovered user information page 400 with a high level of confidence. The system 100 may be further able to determine with a high level of confidence that there should be a suffix field or fields on the user information page 400 based on the parsed requirement from the user story (because the parsed requirement indicates entering multiple suffixes). Additionally, the system 100 may be able to determine with a high level of confidence that a suffix field does not exist within the dynamically discovered model that was generated based on the user information page 400 of the application under evaluation 230, and that a new modeled data suffix component or components may be added to the agglomerated models 208, as a result. However, based on the dynamically discovered data and the parsed requirement from the static discovery process alone, the system 100 may not be able to determine if the suffix field should be added as a direct component of user information (i.e. at the same level as the Name or Address concepts/objects), if the suffixes should be added as subcomponents of the Name or Address concepts, or as subcomponents of one of the Name or Address fields already represented on the user information page 400. As a result, the system 100 may search and match the agglomerated models 208 associated with applications other than the current application under evaluation 230 for uses of the suffix concept. For example, if a suffix concept has been utilized in previous applications as part of the Name object, this would increase the confidence that the suffix should be incorporated as an element of Name within the agglomerated models 208. Based on this knowledge that the suffix is associated with Name, previous implementations may guide the development of additional model elements to include placement of the suffix positionally within Name and/or the implementation of multiple suffixes as a single field or multiple fields. Notably, any of the steps in the process described above may be configured to occur in any order, simultaneously, or repeatedly.

In certain embodiments, the system 100 may actively query additional internal and external sources 201, 202 to resolve any modeling ambiguities. For example, the system 100 may conduct a query of various concept combinations in a search engine to include prefix+suffix, name+suffix, street address+suffix, city+suffix, etc. In response, the search engine may return results that indicate that the prefix+suffix and name+suffix are the most likely combinations based on the number of corresponding hits in the search results. In certain embodiments, the system may query object relationship databases to determine that a prefix and suffix are related concepts, but that neither is a parent of the other. This information may decrease the likelihood that the suffix should be modeled as a subcomponent of the prefix already existing on the page. The query may also reveal that a suffix is a component of a name, and, thus, the likelihood that suffix should be modeled as a component of name would be increased. In certain embodiments, the system 100 may also query additional external and internal sources 201, 202 to further enhance the confidence that suffix is a component of name.

If the system 100 does not require an unambiguous model be added to the agglomerated models 208 for the generation of explicit code segments, snippets, computer programs, or other high confidence outputs, the system 100 may choose to represent the suffix concept ambiguously within the agglomerated models 208. In certain embodiments, the system 100 may choose to delay incorporating the suffix concept in a model of the agglomerated models 208 until additional dynamically or statically discovered model data is available to increase the confidence in the concept above a specified threshold. In the case that the system 100 delays incorporating the concept, the concept model extraction may be repeated as static and dynamic model discovery continues. As extracted and developed concepts of sufficient confidence are obtained, the system 100 may, at step 320, update the agglomerated models 208 by merging the concepts into the models of the agglomerated models 208. This action may be performed under the arbitration of the model change management module 204 of the system 100, which may resolve conflicts and manage issues that may arise from simultaneous and asynchronous static and dynamic discovery conducted by the system 100. Using the example above and based on the static and dynamic discovery conducted by the system 100, the system 100 may generate a resolved model 600 for the user information page, as shown in FIG. 6. In the resolved model 600, a suffix field has been included.

In another use-case scenario, the system 100 may be configured to conduct dynamic discovery using complex data constraints. In certain embodiments, dynamic discovery may be the process whereby the system 100 learns about a particular application under evaluation 230 that is being explored, tested, and/or analyzed by the system 100. If a human tester performs this activity, he may browse requirements or user manuals (static discovery) to develop a high-level understanding of the application under evaluation 230, and then he may actively explore the application under evaluation 230 to match his understanding of requirements to the system's 100 operation. This may be an iterative process with the application under evaluation 230 providing context for understanding the requirements, and the requirements providing context for evaluating the application under evaluation 230. With each iteration, the application under evaluation 230 provides more information and detail that the tester can then take back to the requirements for clarification. This approach, a sort of requirements informed exploratory testing, may be emulated by the discovery subsystem of the system 100. Discovery by a human operator may involve utilizing multiple search and evaluation techniques. For a human operator, no single technique may suffice. Moreover, each technique may benefit from the results of other techniques. For example, one dynamic discovery technique employed by the dynamic model discovery module 206 may involve the use of screen scraping, which may be supported by a crawler, such as explorer 223. Another technique may be a simple set of static discovery tools, requirements parsing, and concept extraction by obtaining information and data from the internal and external data sources 201, 202. In certain embodiments, static discovery may have difficulty parsing and extracting concepts given the ambiguities of natural language without some base model to consult. Likewise, an explorer 223 (e.g. crawler) may get stuck without some guidance from a requirement obtained from an internal and/or external source 201, 202. In certain embodiments, the explorer 223 may not be able to progress beyond a page without some knowledge of the types of data it needs to enter into fields to satisfy constraints based on those entries. These two processes working in concert may be referred to as static model discovery and dynamic model discovery. Dynamic model discovery may work hand-in-hand with one or more explorers 223 capable of navigating through the various states within the application under evaluation 230 to generate models of the application under evaluation 230 that may be included in the agglomerated models 208. This use case focuses on the dynamic portions of the discovery process and its synergistic dependence on static discovery.

Figure 7:
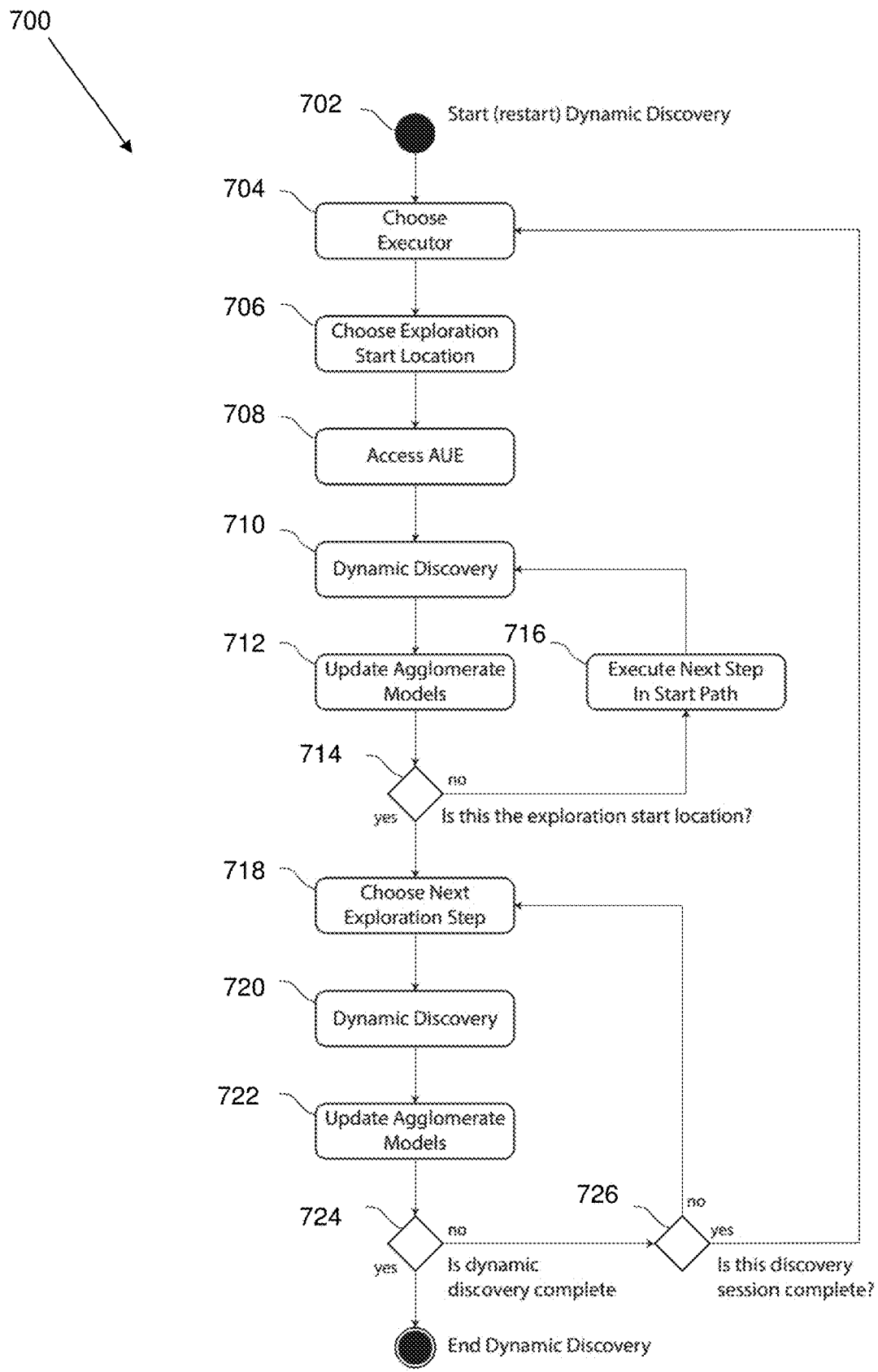
FIG. 7 is a flow diagram illustrating a sample method for conducting dynamic discovery, which may be utilized to facilitate autonomous testing of a computing system according to an embodiment of the present disclosure.

Referring now also to FIGS. 7-8, this use case may focus on the dynamic discovery of a user information page 800 within an application under evaluation 230, such as is shown in FIG. 8. In addition to the user information page 400 shown in the static discovery example described previously, the user information page 800 requires the entry of a valid username, password, home address, email address, and phone number before proceeding to the next page/state of the application under evaluation 230. Due to the complex validation procedures potentially associated with each of these fields individually, a page such as this may act as a barrier to random, q-learning, or pre-coded rule-based explorers as quasi-random or fixed rules are not efficient discovery mechanisms for transiting through a page with complex dependencies. The system 100 resolves this limitation by helping to guide the discovery process through these bottlenecks through the use of contextual information within the outputs of the application under evaluation 230, patterns learned from the evaluation of applications other than the application under evaluation 230, and through the application of requirements and domain information extracted as part of the static discovery process. In the user information page 800, each field must be filled out with valid data, except for the middle initial and prefix fields. While these two fields still must contain valid data for the system 100 to proceed, the entry of no data is a valid option for proceeding. In FIG. 7, a method 700 for conducting dynamic discovery is shown. The dynamic discovery process may be initiated once on an application under evaluation 230 and run continuously, however, in certain embodiments, the dynamic discovery process may be periodically started and/or stopped based on direction from a user, based on direction from data, and/or based on a schedule. The dynamic discovery process may be conducted by various components of the system 100, with particular involvement by the dynamic model discovery module 206 and the evaluators 220. Notably, method 300 and method 700 may be executed concurrently, and both methods 300, 700 may be utilized to update one or more of the agglomerated models 208 in parallel or sequentially depending on preference.

The method 700 may begin at step 702, which may include initiating dynamic discovery or restarting dynamic discovery. Once the dynamic discovery has been initiated or restarted, the method 700 may proceed to step 702, which may include choosing one or more evaluators 220. In certain embodiments, the evaluators may be crawlers. In certain embodiments, the explorer functionality may be split between the evaluators 220 and the dynamic model discovery module 206. The selection of an evaluator 220 may be fixed or the selection may be determined based on the application under evaluation 230 and/or the agglomerated models 208. In certain embodiments, the selection of the evaluator 220 may dynamically change over time, in response to predetermined goals, as a result of a learned neural network response, or on the basis of another modeled or statistical condition. Different evaluators 220 may be optimized to discover different types of application environments. For example, random walkers may be adept at quick discovery for simple applications or during early portions of the discovery process. However, random walkers may have difficulty getting beyond states with complex, ordered constraints, because the random selection of inputs for the application under evaluation 230 may not often satisfy complex constraints given the large number of possible combinatorials. Other evaluators 220, such as Q-Learning explorers, may learn more optimal paths through an application under evaluation 230 by associating higher rewards with higher payoff actions. These rewards may be varied to favor Q-Learners which search for new areas of the application under evaluation 230 and those which attempt to discover the shortest paths within the application under evaluation 230. Other evaluators 220 may use preprogrammed or learned rules and follow prescribed patterns of behavior within the application under evaluation 230. For example, such rule-based evaluators 220 may be designed to fill-out all text fields prior to selecting a button, such as the save button on user information page 800. Deep learning executors (mNNs) may be trained to learn preferred methods of exploration optimized for state discovery speed, depth of search, or other goals. These may be self-trained using statistical and validation data obtained from other evaluators 220, or they may be used in combination with data translators 236 and user feedback. A learning component (e.g. functionality provided by learning engine 226) may be contained within the evaluator 220, shared between the evaluator 220 and the agglomerated models 208, or divided between the evaluator 220 and the learning engine 226. In certain embodiments, dynamic discovery may require the use of one or more explorers 220, however, in other embodiments, the explorers 220 may not be required.

Once the evaluator 220 is chosen at step 704, the method 700 may proceed to step 706, which may include choosing an exploration start location within the application under evaluation 230. In certain embodiments, it may desirable to start the exploration process at a pre-discovered state within the application under evaluation 230. For example, if the system 100 is attempting to discover the constraints associated with input fields at a given state within the application under evaluation 230, the evaluator 220 may be optimized to automatically and efficiently navigate to this page through an already discovered path. If a start location is selected that cannot be directly accessed via the application under evaluation, then the selection of the start location may result in the identification of a path to the start location. The path may consist of a series of actions and/or inputs taken while interacting with the application under evaluation 230, which, if successfully executed, will navigate the application under evaluation 230 to the desired starting state. While not required in all circumstances, as multiple entry points into the application under evaluation 230 may exist, it may be desirable to select the start location prior to accessing the application under evaluation 230 for a given discovery session. Once the start location is selected at step 706, the method 700 may proceed to step 708, which may include accessing the application under evaluation 230, such as by utilizing the evaluators 220 and/or dynamic discovery module 206. The first step in the start path may implicitly or explicitly specify the access mechanism for accessing the application under evaluation 230. As an example, in the case of a web based application, an access plan associated with a given start location of an application under evaluation 230 may specify a URL, user name, and/or password to establish the application under evaluation 230. The access plan for a given application under evaluation 230 may use any of a variety of direct or indirect connection mechanisms, protocols, authentication procedures, and/or initial condition steps. In certain embodiments, similar steps may be invoked at the end of a discovery session to clear any created discovery data from the application under evaluation 230 and return the application under evaluation 230 to a known state. In embodiment where a direct connection to the application under evaluation 230 is provided and no credentials are required, this step may be skipped.

Once the application under evaluation 230 is accessed by the system 100, the method 700 may proceed to step 710 by conducting dynamic discovery on the application under evaluation 230. In the exemplary embodiment of method 700, all outputs of the application under evaluation 230 may be provided to the dynamic model discovery module 206 to include the results of the login process. While discovery does not absolutely require the processing of pre-discovered steps through dynamic discovery, in certain embodiments this may be desired. The dynamic discovery process may execute a process similar to that for static discovery, as shown in method 300. In the case of a web application (i.e. application under evaluation 230), the parsing process may be referred to as scraping a page. Scraping may be the act of extracting the content of the web page in an organization which can be interpreted by the application and/or the system 100. Concepts may then be extracted from the parsed information and they may include identifying the set of actionable fields, buttons, or widgets; attempting to identify the type of the input expected; comparing the extracted concepts to those contained in the agglomerated models 208 for further insights, such as is described for the static discovery process of method 300. In certain embodiments, the application under evaluation 230 may generate a path exception, which may be a transition to a state other than the expected state in the path. Such a transition may reflect the discovery of a previously unknown state, the discovery of a previously unknown transition, the execution of an indeterminate transition, or the execution of a determinate transition for which the agglomerate model representation of the transition is inaccurate, imprecise, or indeterminate. In such a scenario, the evaluator 220 may choose one of several options: 1) the evaluator 220 could stop the current discovery session; 2) the evaluator 220 could recalculate a new path to the desired start location; or 3) the evaluator 220 could choose a new exploration start location to include potentially choosing the current state of the application under evaluation 230 as the new exploration start location. In the latter example, after updating the agglomerated models 208 at step 712 based on the outputs of the discovery process, the system 100 may proceed through the decision step 714 to choose the next exploration step at step 718.

As outputs of the discovery process are generated based on interactions with the application under evaluation 230 at step 710, one or more of the agglomerated models 208 that are associated with the application under evaluation 230 may be updated at step 712. At step 714, the method 700 may include determining if the exploration start location chosen in step 706 has been reached. If the exploration start location has not yet been reached, the system 100 may, at step 716, execute the next step in the start path until the start location has been reached, or until one of the dynamic discovery exceptions described above is encountered. If, however, the exploration start location has been reached, the discovery process proceeds. Once the start state has been achieved, the system 100 may proceed, at step 720, with discovery of the application under evaluation 230 according to the path determining parameters of the selected evaluator 220, as described above. The primary difference with the exploration phase and the initial phase described above is that the next step is determined dynamically based upon the current state of the agglomerated model 208 and the outputs of the application under evaluation 230. Based on the outputs from discovery, one or more of the agglomerated models 208 may be updated based on the outputs, at step 722. At step 724, the method 700 may include determining if dynamic discovery is complete. If so, the method 700 may end or be restarted at step 702. In certain embodiments, dynamic discovery may run indefinitely or it may complete after a set period of time, after a certain number of steps have been executed, after a set state is achieved, based upon a user action, based on a specific output of the application under evaluation 230, as a consequence of hardware availability of the application under evaluation 230 and/or the system 100 itself, and/or if a goal is achieved as determined by the current agglomerated models 208 and output of the application under evaluation 230. Ending dynamic discovery at any point may not prevent the system 100 from restarting discovery immediately or at a later time, after a specified time delay, as the result of a user action, if the agglomerated models 208 change in a significant manner, or as the result of a goal determined by the current agglomerated models 208 and output of the application under evaluation 230 being achieved. At the end of dynamic discovery, the system 100 may execute a set of steps to return the application under evaluation 230 to a desired state.

If, at step 724, dynamic discovery is not complete, the method 700 may proceed to step 726, which may include determining if the dynamic discovery session is complete. If the dynamic discovery session is not complete, the method 700 may proceed back to step 718 and continue until the discovery session is complete. If the discovery session is complete, the method 700 may proceed back to step 704 or to any other desired step. In certain embodiments, similar conditions to those determining the completion of dynamic discovery may be utilized to signal the end of a dynamic discovery session. At the end of a dynamic discovery session, the system 100 may execute a set of steps to return the application under evaluation 230 to a desired state. Without the use of data from static sources, validated fields may represent impenetrable barriers to the automatic exploration of an application under evaluation 230. Through the system's 100 novel features and functionality, the system 100 allows the synergistic use of dynamically discovered data to help understand available static sources, and available static sources to help explore the application under evaluation 230.

In another use case scenario, the system 100 may be configured to test an application under evaluation 230 by utilizing the agglomerated models 208. A unique aspect of the system 100 is its ability to utilize the developed agglomerate model representations in the agglomerated models 208 to execute tests on the application under evaluation 230, and, in the process, train agglomerate model confidences. Using specialized validators 222, the system 100 can implement a variety of testing methodologies against the application under evaluation 230. For example, an analysis engine 239 may take one model of the agglomerated models 208, such as FSM model 209, and may construct test cases (e.g. which may be scripts composed of computer code 244), execute the test cases (such as by utilizing validator 222), and produce test results 246, test data 247, or a combination thereof. Based on the test results 246 and test data 247, report generator 238 may generate test case result reports 242. An example test case for the system 100 may be to go to the user information page 600 in FIG. 6 and verify that all the expected fields are there including the new suffixes field. If any field is missing, or additional fields show up, the system 100 may generate a defect as part of test data 247 that a human (e.g. first user 101) or device (e.g. first user device 102) can investigate further. The defect may show up in a regression test report 242 that was generated by report generator 238. Notably, any of test results 246, test data 247, or reports 242 may be reviewed by a user on user interface 228 or even by a device or program. The system 100 may choose to rerun this test case every time the code base of the application under evaluation 230 (or user information code) changes to verify that no regression occurred. A user or device's confirmation or rejection of defects may be utilized to direct learning feedback that can be used to vary the confidences associated with agglomerated model components and provide training for the components of the system 100 that generate the updates to the agglomerated models 208.

In yet another use case scenario, one or more composers 221 (a type of executor/evaluator 220) of the system 100 may be utilized. The components of the composers 221 may utilize data from the agglomerated models 208 to create an execution path within the application under evaluation 230, which can be used to provide targeted answers, which may otherwise be unavailable, in real-time or near real-time. In one example embodiment, the user interface 228 may receive a query from the first user 101 who is using application under evaluation 230, which may be: "how can I quickly add 100 new users to the system?" In interpreting this request, the user interface 228, via the controller 224, may interpret the request using the agglomerated models 208, to include the LM model 215, the LM-NN model 214, and the CM models 216 to extract the content of the question. Therefrom, additional agglomerated models 208, such as the FSM models 209, LTL models 210, ER-DB models 211, AC models 212, and SQ models 213 may be used to identify potential workflows (i.e. paths) through the application under evaluation 230 that may accomplish the user's request. These paths could be compared by the composer 221 to determine the easiest to use and most efficient path. Once selected, the composer 221 may then execute this path on the application under evaluation 230 using self-generated inputs, which satisfy the constraints contained in the FSM models 209, ER-DB models 211, or other agglomerated models 208. Alternatively, the composer 221 could receive sample data from the first user 101 or even the first user device 102. Furthermore, the composer 221 may pass screenshots of each step in the path to a media converter 237, which may in turn, compose a training video of the actions taken to efficiently add multiple users to the application under evaluation 230. This result could be further processed by a report generator 238. As a result, the system 100 can utilize its high confidence model of the application under evaluation 230, composed from static and dynamically discovered information, to construct the specific set of steps associated with particular workflows of the application under evaluation 230. Data from the execution of such paths can not only be used by validators 222 to test such workflows, but the data may be used by composers 221 to construct higher level outputs for training, analysis, code generation, and compiled computer programs.

In a further use-case scenario, the system 100 may be utilized to create on-demand autopilots in a complex application under evaluation 230 capable of navigating from an initial state X to a target state Y in the application under evaluation 230. For example, via the user interface 228, the first user 101 may say, "take me to the screen where I can add a city income tax withholding for an employee". The system 100 may generate the steps to move from the initial state to the target state. The system, via the composer 221 in concert with the user interface 228, may execute the steps for the first user 101 to go to the system state. In certain embodiments, the system 100 or user may map such a command (e.g. go to target state Y) to a visually rendered digital button in the user interface 228. The button may not be a simple link to a script or macro, but may be a link to an intelligent system, which from any state (not just the initial state X in the original step) can take the first user 101 on autopilot to the target state, and the path to target state Y would be resolved as needed (either on-demand or proactively based on learned patterns from current user or past users as suggested from learning engine 226). In certain embodiments, the first and/or second user 101, 110 may be able to watch the autopilot system as it navigates through states of the application under evaluation 230. In certain embodiments, a user may be able to adjust the speed (e.g. play, pause, fast forward, rewind) of the execution of the autopilot to either skip over mundane portions or slow down over critical sections, rewind, or pause for any reason.

In a slightly more complex use-case scenario, the first user 101 may say, "take me to the screen where I can add a city income tax withholding for an employee with Social Security number 123-45-6789." The scenario is similar to the previous one, except that the composer 221 may need to do additional lookups on the application under evaluation 230 to load the exact data for that particular user with social security number 123-45-6789. In certain embodiments, the composer 221 may pull some of this data directory from a database 155 as opposed to going through the application under evaluation 230. The target screen may then be presented to the first user 101 with the particular user and user data already loaded, such as via first user device 102. In a slightly more complex use-case scenario, the first user 101 may say, "enter the income tax withholding as 1% for employee with Social Security number 123-45-6789". This scenario is similar to the previous one, except that the composer 221 will have to enter the value of 1% in the correct field (employee withholding for city), and then the system 100 will have to save or commit the change. In certain embodiments, the system 100 may prompt the user to approve before it hits save/commit (e.g. are you sure you want to update the employee withholding to 1% for city Lansing, Mich. for employee 123-45-6789? Yes or No?).

In still a slightly more complex use-case scenario, the first user 101 may request an extension not present in the application under evaluation 230 as originally implemented. Such macros may include entirely new interfaces, web pages, etc., which allow the first user 101 to execute collections of existing application under evaluation 230 steps repeatedly, in groups, with default data, with bulk inputs, or with any possible combination of existing application under evaluation 230 steps. For example, if an application under evaluation 230 allows the first user 101 to enter a bonus for a given employee one employee at a time, the first user 101 may ask, "provide me with an interface that allows me to enter bonuses for all the employees in the development group." A composer 221, which may access the agglomerated models 208, may understand the workflow associated with entering a bonus for a given employee. Additionally, the composer 221 may understand how to return a collection of all employees within a given group such as the development group. The composer 221 might further understand how to compose a table-based data entry screen allowing for the entry of a data item associated with each element in a collection. This understanding may be achieved either as the result of an explicitly coded macro solution, from a template learned from the application under evaluation 230, or from domain understanding derived from multiple applications under evaluation 230. Based on the agglomerated models 208, the composer 221 may then automatically generate a new capability (e.g., a new web page) allowing for the efficient entry of bonuses for all the employees within the development group. The composer-generated macro may then be translated and delivered to the user via a data transformer 232 as a new web page interface, a new application programming interface, etc. The auto-generated macro delivered by the data transformers 232 may execute the individual application under evaluation 230 steps necessary to achieve the stated new user requirement.

In another use-case scenario, a composer 221 may operate with a validator 222 to verify the results of the suggested composer 221 prior to utilization of the composer 221 by the first user 101 or other external device/component (e.g. first user device 102). To use the previous use case as an example, the validator 221 may execute a suitable test suite on the custom generated web page to validate that the composed solution allows bonuses to be entered for each of the employees within the development group without defect. The employed test suite may ensure that the fields are properly validated and utilized within the application under evaluation 230. The validation test suite could be executed in near real-time or real-time prior to the delivery of the requested capability to the first user 101. If a defect is found in the composed functionality, the system 100 may provide an appropriate indication to the first user 101. In an embodiment, the validation may occur on a test or backup application under evaluation 230 before providing the custom generated web page on the production application under evaluation 230 to the first user 101. Thus, if a defect is uncovered on the test or backup application under evaluation, it may not adversely affect the production application under evaluation 230.

The above-described ability to self-generate and self-validate new functionality is an advanced capability of the system 100, which depends on the ability to correlate a new statically discovered requirement or requirements (e.g. the user requests in the preceding use-case scenarios as examples) with the contents of the agglomerated models 208. Notably, the agglomerated models 208 contain the synergistically combined results of the dynamically discovered model of the application under evaluation 230 and the content of previously discovered static information sources. The extension of the agglomerated models based on user input may not require that the first user 101 state a requirement in an explicitly precise modeling language. Instead, the system 100 enables the first user 101 to present relatively imprecise queries or requirements, which may not be interpretable by people or systems as stand-alone inputs. The system 100 may interpret imprecisely worded sources and requirements in the context of the agglomerated models 208 developed from the application under evaluation 230 and other static discovery sources. These new extensions may be dynamically discovered and validated as with any baseline capabilities of the application under evaluation 230.

In another use-case scenario, the system 100 may test an application under evaluation 230 with labeled screens and no explicit requirements. This use case may focus on a registration page within an application under evaluation 230, which requires that the first user 101 enter a valid username, password, home address, email address, and phone number. In this use case, the application under evaluation 230 may have two apparent defects that initially generate test failures: 1. The phone number field is not validated and allows a user to input non-numeral special characters such as, '!', '@', '#', '$', '%', in the phone number. 2. The application enables entering of a user name that already exists, which should generate an exception, and prevent duplicate user names in the system 100. The system 100 may conduct initial discovery of the page model by conducting initial page scraping (describe what data is pulled off the page, text sources by natural language processing, actionable widgets, etc.). In this example, the phone number field may be scraped from the page. The system 100 may then proceed to conduct initial semantic relationship resolution by identifying associated labels and fields in the document. Several fields may be identified as all pertaining to attributes of the first user 101. The system 100 may proceed to conduct initial natural language processing of fields to provide directed discovery. For example, the system 100 may understand that a field is a phone number, and should accept valid phone numbers. The system 100 may utilize the dynamic model discovery module 206 to build a model of the application under evaluation 230 by building a state representing the web page, and links to previous/future screens, for example.

The system 100 may then proceed to test generation. The first user 101, for example, may define test methodologies to execute on the application under evaluation 230 and the system 100 may generate tests appropriate to the goal. In other embodiments, the system 100 may simply choose the appropriate tests for the first user 101. The first user 101 or system 100 may choose to perform equivalence class testing on the application under evaluation, which may be capable of detecting the phone number defect, and pairwise testing, which may be capable of detecting the username reuse defect, or others such as boundary, state transition, etc. In certain embodiments, tests may be generated based on the discovered models of the agglomerated models 208. The system 100 may then proceed to test execution. The previously generated tests may be executed, and the results may be monitored and reported on. For example, the system 100 may allow the input of special characters in the phone number field, which the system 100 may determine is improper based on domain knowledge relating to the appropriate format of a phone number. As another example, a duplicate user name is used, and the application under evaluation 230 generates an exception versus a formatted message to the first user 101. After test execution, the system 100 may enable the first user 101 to review the test results 246. In some embodiments, the first user 101 may reject the phone number test failure detected because special characters may be valid for phone numbers in the application under evaluation 230. In another embodiment, the phone number requirement may be input as a new JIRA, which may state that special characters are allowed in the phone number. Thus, the system 100 may update its understanding of valid phone numbers in both the model and generated test cases. In certain embodiments, the first user 101 agrees that the duplicate user name exception error as reported by the system 100 is a defect. The system 100 may learn, such as via learning engine 226, from the rejection of the phone number test failure and no longer reports additional phone number test failures when special characters are used for the first user's 101 application under evaluation 230. Secondly, the system 100 learns that it was correct in identifying the username exception and increases its confidence in the technique that uncovered this error going forward. The rule that certain errors should not be generated when the application under evaluation 230 is analyzed next may be based on domain knowledge. This can be initially learned through one of three methods, for example. First, there may be default rules. For example, the fact that certain errors should be flagged as a test failure may be coded internally into the system 100. Secondly, an external source document (e.g. obtained via internal and external data sources 201, 202) with error codes is explicitly provide to the system 100 to parse and incorporate. The system 100 may generate internal rules based on the parsed error code document, which may be utilized to overwrite default rules. Third, if an error is generated which the system 100 has not previously detected, the system 100 may search for the error message from external documents (e.g. from JIRAs or from the web) and automatically update its domain knowledge.

The first user 101 or an external source, such as, but not limited to, first user device 102 or second user device 112 could review the failed tests associated with the use of special characters in the phone number field. In this case, the phone numbers with special characters may be allowable in this future application (i.e. the application under evaluation 230). Based on the first user's 101 rejection of the failed test related to the phone number equivalency test, the system 100 may modify its model of the application under evaluation 230 to allow for special characters for that specific phone number field. The system 100 may also modify the domain rules (e.g. confidences) for phone number equivalence class definitions as they apply to this application under evaluation 230, across all applications, or within similar domains. The system 100 may also modify other domain rules (e.g. confidences) for broader equivalence class types that may share formatting rules with phone numbers within and across applications. As the user feedback is generalized within or across applications, and to broader equivalence class types, the rate or magnitude of the rule adjustment (i.e. confidence change) may decrease. The system 100 may require additional confirming information to change broadly applicable model rules across applications than it will within a single page of a single application. Similarly, a confirmed test may increase confidence levels in techniques, data sources, release notes, etc. that correlate with the successful hypothesis.

In yet a further use-case scenario, the system 100 may be configured to test an application under evaluation 230 with requirements in the form of user stories. In this use case, a new JIRA may be inputted into the system 100, which may require that attempts to create duplicate usernames result in a name suggestion component, which appends a unique number to the username. For example, Briggs as an input username duplicate may generate a suggestion as Briggs123. For this application under evaluation 230, the system 100 may begin by parsing an input JIRA from an internal source 201, such as by utilizing natural language processing. The system 100 may generate a model hypothesis based on the JIRA, and may refine the model hypothesis based on a comparison to an actual model in the agglomerated models 208 that is associated with the application under evaluation 230. The system 100 may generate hypothesis tests, execute the tests, and learn based on the results of the tests. The refining step and the hypothesis generation, text execution and learning step may be repeated as necessary until confidences are sufficient. Once sufficient, the system 100 may generate, execute, and report the tests to the first user 101, to other users, or even to other devices. The system 100 may proceed to further refine the hypothesis for the model based on feedback received from the first user 101 in response to the reports 242.

In certain embodiments, the JIRA may contain requirements that are not convertible to model representations without domain knowledge or information from the application under evaluation 230. For example, a JIRA story for the suggested story may state, "When I am registering, if I submit an invalid name, I would like to see user name suggestions. At least one user name clue should be provided which appends a number onto the initial input." Users rely on their knowledge of the domain and the application under evaluation 230 to properly interpret the meaning of JIRA stories and other documents. By comparison, the system 100 determines the most likely hypotheses by iteratively or recursively comparing the parsed text with existing discovered knowledge of the application under evaluation 230, with other documents from internal or external sources 201, 202, with new documents it obtains through a search, and through active hypothesis testing. In this example, using the techniques mentioned, the system 100 may resolve that "I" in this case is referring to a new user by noting that the "I" is registering and that new users fill out the registration forms. The system 100 may utilize other JIRA, workflow, training, application programming interface, requirements documents, etc., to reinforce this hypothesis. The system 100 may then build hypotheses about the meaning and use of an "invalid name." To accomplish this, the system 100 may again refer to previously discovered knowledge of the application under evaluation 230 and infer that name is referring to the user name field on the registration page. The system 100 may then utilize domain knowledge and a trained natural language processing parser to understand that invalid is modifying the user name.

Additionally, the system 100 may deduce that "clue" references the addition of suggestion text to the registration page or an associated pop-up. The system 100 may further conclude how the suggestion text should be presented based upon a style guide or other document that may have been input into the system 100. Consistency rules learned by the system 100 may further define for the system 100 the acceptable methods of providing a clue to the user by comparing the implementation with other similar implementations for this application, for this development team/company, or within the domain. The system 100 may further conclude what it means to append a number onto the initial input by sequentially developing hypotheses about the equivalency class and testing those hypotheses recursively. In certain embodiments, the system 100 may search the web for information about appending a number to a username to develop a better notion of what it meant, by the phrase, "which appends a number onto the initial input." As is illustrated by this example, no single information source or step may be sufficient to resolve an accurate, testable model of the expected system behavior. Rather, iterative and recursive inferences developed through the consideration of information from across document sources and the application under evaluation 230 may be necessary.

The above use case highlights that the models in the agglomerated models 208 may be derived from both document sources and the application under evaluation 230. In this case, the new JIRA will initially extend the discovered application under evaluation 230 with representations of the new expected functionality requested by the JIRA. Initially, the tests that the system 100 may construct to confirm that this new functionality is working correctly will likely fail as the application under evaluation 230 may not have been updated to reflect the new functionality at the time of the initial tests conducted by the system 100. While tests may fail, the learning engine 226 of the system 100 may interpret the failures with the knowledge that the functionality may not yet be incorporated. The system 100 may know when the JIRA was input into the system 100, the dates the parser was able to extract from the JIRA, the "learned" average time it takes to incorporate a JIRA, and the parsed knowledge that the JIRA is still open. When the tests begin to pass, the system 100 can then learn which of the potentially several specific methods were utilized for providing user name suggestions. With this information, the system 100 can create new equivalency classes as required or modify the confidences associated with their selection and use by the system 100. Similarly, the system 100 can reinforce its strengths and confidences associated with natural language processing learning and model consolidation. Also, during the discovery process, the learning engine 226 may respond to discovery queries for information by searching the web or other available internal or external data sources 201, 202 causing those documents, which adequately satisfy the query to be input into the system 100. The learning engine 226 may further adjust the confidences of various data sources based on the test results.

Notably, another system, without the functionality provided by system 100, may build a model from the application under evaluation 230 alone—that is without utilizing model information and data gathered from internal and external data sources 201, 202. This other system may be unable to represent new requirements contained in a JIRA in its developed model of the system, and it would likewise be unable to test the new functionality until it was fully incorporated into the application under evaluation 230. Another system, without the functionality provided by the system 100, may build a model from only requirements sources, and may be unable to construct a testable model of the application under evaluation 230 due to information gaps in the requirement's source. Without understanding the capabilities of the application under evaluation 230, such a system may be unable to infer who is being referred to by "I" in the JIRA and that "name" is really referring to the "user name." Such a system may also lack the knowledge to develop an executable test as such a system lacks the knowledge of the application under evaluation 230 to reach the registration page or to fill-out the other required information before the next button is activated and the user name duplicate suggestion is generated. The system 100 solves these issues.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, parsing data and information from sources; extracting source concepts from parsed data and information; generating model updates for the agglomerated models 208; selecting evaluators 220; selecting exploration start locations in the application under evaluation 230; conducting dynamic discovery; updating the agglomerated models 208 based on static and dynamic discovery; executing tests on the application under evaluation 230; detecting potential defects or potential conflicts with the application under evaluation 230; generating reports 242 indicating the defects and/or conflicts; receiving feedback on the detected conflicts and/or defects; generating software functionality and code to rectify the defects and/or conflicts; updating the agglomerated models 208 based on the feedback; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-2 illustrates specific example configurations of the various components of the system 100, the system 100 may include any configuration of the components, which may include using a greater or lesser number of the components. For example, the system 100 is illustratively shown as including a first user device 102, a second user device 111, a communications network 135, a server 140, a server 150, a server 160, and a database 155. However, the system 100 may include multiple first user devices 102, multiple second user devices 111, multiple communications networks 135, multiple servers 140, multiple servers 150, multiple servers 160, multiple databases 155, or any number of any of the other components inside or outside the system 100. Similarly, the system 100 may include any number of internal data sources 201, external data sources 202, static model discovery modules 200, model change management modules 204, dynamic model discovery modules 206, agglomerated models 208, evaluators 220, data transformers 232, controllers 224, learning engines 226, user interfaces 228, applications under evaluation 230, any other component, program, or device of the system 100, or a combination thereof. In certain embodiments, substantial portions of the functionality and operations of the system 100 may be performed by other networks and systems that may be connected to system 100. In certain embodiments, the architecture of the system 100 may relate key functional elements, while remaining agnostic as to the technical processes employed within each functional element of the system. For example, deep neural networks, natural language processing, Bayesian analysis, and a variety of other techniques may be employed within any of the primary functional elements (static model discovery module 200, model change management module 204, dynamic model discovery module 206, evaluators 220, and data transformers 232) as well as within the cross-functional elements of the system 100 (controller 224, learning engine 226, and user interface 228). In certain embodiments, the system 100 may operate in conjunction with a single application under evaluation 230 or across multiple applications under evaluation 230. In certain embodiments, the system 100 may operate in a multi-threaded environment with multiple instances of each module, program, and/or component of the system 100 operating in parallel. Such parallel operations may be limited, in certain embodiments, by predetermined limits or ratios, performance metrics and statistics, hardware availability, user interfaces, external interfaces, and access limitations associated with the application under evaluation 230.

Figure 9:
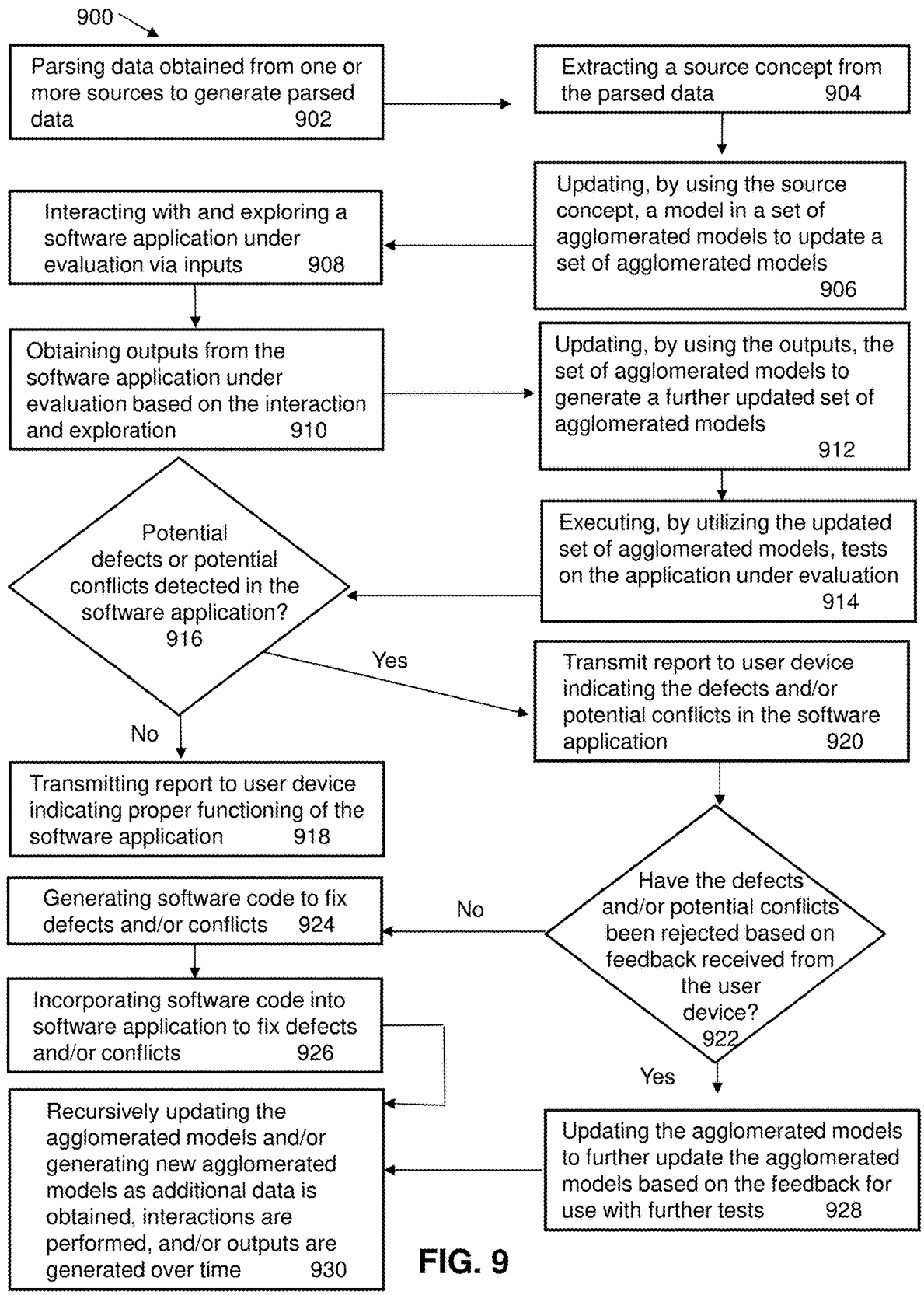
FIG. 9 is a flow diagram illustrating a sample method for autonomously testing a computing system according to an embodiment of the present disclosure.

As shown in FIG. 9, an exemplary method 900 for autonomously testing a computing system is schematically illustrated. For the purposes of method 900, a user, such as first user 101, or a device, such as first user device 102, may be interested in testing a particular software application (e.g. application under evaluation 230) before the software application is made available to others. A static discovery process may be initiated, and the method 900 may include, at step 902, parsing data and information obtained from a variety of sources, such as internal data sources 201 and external data sources 202, to generate parsed data. The data and information obtained from the sources may include, but is not limited to including, user stories, requirements, documentation, domain knowledge, external information, existing test cases, computer software code, other data and information, or a combination thereof, which may be utilized to facilitate the creation of models and/or update models. In certain embodiments, the parsing may be performed and/or facilitated by utilizing the static model discovery module 200, the controller 224, the first user device 102, the second user device 111, the server 140, the server 150, the server 160, the communications network 135, any combination thereof, or by utilizing any other appropriate program, network, system, or device.

At step 904, the method 900 may include extracting one or more source concepts from the parsed data. For example, if the parsed data comprises a user information web page, the method 900 may utilize natural language processing and/or a convolutional neural network to extract the subject, action, object, and/or page reference information from the parse data. In certain embodiments, the extracting of the one or more source concepts from the parsed data may be performed and/or facilitated by utilizing the static model discovery module 200, the controller 224, the first user device 102, the second user device 111, the server 140, the server 150, the server 160, the communications network 135, any combination thereof, or by utilizing any other appropriate program, network, system, or device. At step 906, the method 900 may include updating, by utilizing the extracted source concept, one or more models in a set of agglomerated models 208. In certain embodiments, the one or more concepts may be required to have a threshold confidence level in order to be utilized to update the one or more models in the set of agglomerated models 208. Concepts falling below the threshold confidence level may be prevented from updating the one or more models. In certain embodiments, the updating of the models may be performed by utilizing the static model discovery module 200, the model change management module 204, the first user device 102, the second user device 111, the server 140, the server 150, the server 160, the communications network 135, any combination thereof, or by utilizing any other appropriate program, network, system, or device. In certain embodiments, the source concepts may be refined based on one or more models of the agglomerated models 208 over time. For example, as one or more models are updated and/or modified over time, one or more source concepts may be refined accordingly.

At step 908, the method 900 may include interacting with and exploring the software application under evaluation by utilizing one or more inputs so as to conduct dynamic discovery. In certain embodiments, the interacting and exploring may be conducted so that the system 100 may learn about the software application under evaluation. For example, the method 900 may include utilizing an explorer/evaluator 220 to navigate through various functional digital pages in the software application by inputting input data into fields on the digital pages that satisfy constraints for the fields. The explorer/evaluator 220 may transition from each state in the software application to obtain as much information about the software application as possible. In certain embodiments, the interacting and exploring may be performed and/or facilitated by utilizing the dynamic model discovery module 206, the model change management module 204, the application under evaluation 230, the first user device 102, the second user device 111, the server 140, the server 150, the server 160, the communications network 135, any combination thereof, or by utilizing any other appropriate program, network, system, or device. At step 910, the method 900 may include obtaining outputs from the software application under evaluation based on the interactions and exploration. Using the example above, the outputs may be generated by the software application in response to the inputs inputted into the fields on the digital pages and proceeding through the various states and functional aspects of the software application. In certain embodiments, the outputs may be obtained by utilizing the dynamic model discovery module 206, the model change management module 204, the application under evaluation 230, the first user device 102, the second user device 111, the server 140, the server 150, the server 160, the communications network 135, any combination thereof, or by utilizing any other appropriate program, network, system, or device.

At step 912, the method 900 may include updating, by utilizing the outputs obtained from step 910, the updated set of agglomerated models 208 to generate a further updated set of agglomerated models 208. In certain embodiments, the updating of the models may be performed by utilizing dynamic model discovery module 206, the model change management module 204, the first user device 102, the second user device 111, the server 140, the server 150, the server 160, the communications network 135, any combination thereof, or by utilizing any other appropriate program, network, system, or device. At step 914, the method 900 may include executing, by utilizing the updated set of agglomerated models 208, one or more tests on the software application under evaluation. In certain embodiments, the tests may be performed by utilizing the evaluators 220, the application under evaluation 230, the first user device 102, the second user device 111, the server 140, the server 150, the server 160, the communications network 135, any combination thereof, or by utilizing any other appropriate program, network, system, or device. At step 916, the method 900 may include determining if potential defects and/or potential conflicts have been detected in the software application under evaluation. In certain embodiments, the determining may be performed by utilizing the evaluators 220, the application under evaluation 230, the first user device 102, the second user device 111, the server 140, the server 150, the server 160, the communications network 135, any combination thereof, or by utilizing any other appropriate program, network, system, or device.

If, at step 916, the method 900 determines that there are not potential defects and/or conflicts in the software application after execution of the tests, the method 900 may proceed to step 918. At step 918, the method 900 may include generating and transmitting a notification, such as a report, to a user device (e.g. first user device 102) of the user that was interested in testing the software application. In certain embodiments, the report may indicate that the software application passed the tests and that no errors, defects, or conflicts were detected. In certain embodiments, the generating and transmitting of the notification may be performed by utilizing the data transformers 232, the first user device 102, the second user device 111, the server 140, the server 150, the server 160, the communications network 135, any combination thereof, or by utilizing any other appropriate program, network, system, or device. If, however, at step 916, it is determined that there are potential defects and/or conflicts in the software application after execution of the tests, the method 900 may proceed to step 920. At step 920, the method 900 may include transmitting a notification (e.g. report) to the user device indicating any detected defects and/or conflicts. In certain embodiments, the report may even include possible options for rectifying the defects and/or conflicts or for retrying the failing scenario on the software application.

In certain embodiments, the user and/or the user device may be provided with the option to confirm or reject the detected defects and/or conflicts described in the notification. At step 922, the method 900 may include determining if the detected defects and/or conflicts have been rejected or confirmed based on feedback received from the user device in response to the notification sent to the user device. In certain embodiments, the determining may be performed by utilizing the evaluators 220, the controller 224, the learning engine 226, the first user device 102, the second user device 111, the server 140, the server 150, the server 160, the communications network 135, any combination thereof, or by utilizing any other appropriate program, network, system, or device. If the defects and/or conflicts have not been rejected, the method 900 may proceed to step 924. At step 924, the method may include generating software code to fix the detected defects and/or conflicts in the software application. In certain embodiments, the software code may be generated by utilizing the data transformers 232, the first user device 102, the second user device 111, the server 140, the server 150, the server 160, the communications network 135, any combination thereof, or by utilizing any other appropriate program, network, system, or device. Once the software code is generated, the method 900 may proceed to step 926. At step 926, the method may include incorporating the generated software code into the software application so that the software application functions as desired. In certain embodiments, the incorporating may be performed by utilizing the data transformers 232, the controller 224, the first user device 102, the second user device 111, the server 140, the server 150, the server 160, the communications network 135, any combination thereof, or by utilizing any other appropriate program, network, system, or device.

If, however, at step 922, the detected defects and/or conflicts have been rejected based on feedback by the user device, the method 900 may proceed to step 928. At step 928, the method 900 may include updating, based on the feedback, the agglomerated models 208 to generate yet a further updated set of agglomerated models 208. In certain embodiments, the updating of the agglomerated models 208 may be performed by utilizing the model change management module 204, the first user device 102, the second user device 111, the server 140, the server 150, the server 160, the communications network 135, any combination thereof, or by utilizing any other appropriate program, network, system, or device. The updated set of agglomerated models 208 may be utilized for future tests on the software application or for even other software applications to be evaluated by the system 100. At step 930, the method 900 may include recursively and/or iteratively updating one or more of the models in the sets of agglomerated models 208 and/or generating new agglomerated models 208 as additional data is parsed over time, as additional source concepts are extracted over time, as additional interactions with the application under evaluation 230 are conducted over time, as interactions are conducted with other applications over time, as outputs are generated over time, as further feedback is provided over time, or any combination thereof. In certain embodiments, the steps of method 900 may be performed in any desired order. As a non-limiting example, steps 908-912 may be conducted prior to steps 902-906 so that models are updated based on interactions with the application under evaluation 230 prior to updating the models based on parsed data and source concepts extracted from the parsed data.

In certain embodiments of the method 900, each model generated and/or updated may be validated. In validating a model, method 900 may include checking and/or comparing the model against internal and/or external requirements, data, specifications, and documented expectations of the application under evaluation 230. In certain embodiments, the expectations may be described in text or media of the application under evaluation 230 itself and do not have to obtained from external sources 202. For example, if the text of the application asks that a user enter in a name or other information into the application under evaluation 230 with a certain formatting, the description of the expected functionality may be an implicit requirement that may be validated against the model of the application under evaluation 230. In certain embodiments, the method 900 may also include verifying the models. The models may be verified by checking that the system performs against the models in an expected manner, where parts of the models may be generated by utilizing information drawn from the internal and/or external user stories, requirements, data, specifications and documented expectations. Notably, in certain embodiments, the validating and/or verifying may be performed at any step of the method 900 when a model is being generated and/or updated or at any other desired time. Once verified and/or validated, the verified and/or validated models may facilitate the autonomous testing of the application under evaluation 230, such as in step 914. When testing the application, the system and methods may compare the performance of the application being evaluated against one or more models of the set of agglomerated models. In certain embodiments, the testing may be performed against an agglomerated model that reflects the expected performance of the application as observed irrespective of the requirements. In certain embodiments, the testing may be performed against a version of an agglomerated model that incorporates expectations from external and/or internal requirements, user stories, specifications, and/or other sources. The testing, such as in step 914, may be utilized to verify actual performance of the application under evaluation 230 with respect to a model when the model is used as part of an analysis tool, when the model is used for the automatic generation of paths for autopilot and training use cases as described in the present disclosure, and/or when the model is used for the automated extension of features of the application under evaluation 230. In certain embodiments, the extension of features (e.g. by incorporating extension functions) of the application under evaluation 230 may be utilized to add additional functionality to the application under evaluation 230, adjust, increase and/or improve performance of one or more functions of the application under evaluation 230, adjust, increase and/or improve performance of the entire application under evaluation 230 itself, or a combination thereof. Notably, the method 900 may further incorporate any of the features and functionality described for the system 100 or as otherwise described herein.

The systems and methods disclosed herein may include further functionality and features. For example, the operative functions of the system 100 and methods 300, 700, 900 may be configured to execute on a special-purpose processor specifically configured to carry out the operations provided by the system 100 and methods 300, 700, 900. Notably, the operative features and functionality provided by the system 100 and methods 300, 700, 900 may increase the efficiency of computing devices that are being utilized to facilitate the functionality provided by the system 100 and methods 300, 700, 900. For example, the system 100 and methods 300, 700, 900 can optimize the performance of future actions through machine learning, such that a reduced amount of computer operations need to be performed by the devices in the system 100 using the processors and memories of the system 100 than in systems that are not capable of machine learning as described in this disclosure. In such a context, less processing power may need to be utilized because the processors and memories do not need to perform actions, operations, and analyses that have already been conducted by the system 100. In certain embodiments, the system 100 may learn that certain state(s) associated with and/or from discovery and/or testing may be faster on certain processing hardware. For example, for a state with complex mathematical operations and/or graphics, the system 100 may perform better when there is a floating point processor or a graphics processing unit. As a result, the functionality provided by the system 100 and methods 300, 700, 900 may provide substantial savings in the usage of computer resources by utilizing the software and functionality provided in the present disclosure.

Notably, in certain embodiments, various functions and features of the system 100 and methods may operate without human intervention and may be conducted entirely by computing devices, robots, programs, and/or processes. For example, in certain embodiments, multiple computing devices may interact with devices of the system 100 to provide the functionality supported by the system 100. Additionally, in certain embodiments, system 100 may operate continuously to reduce the possibility of defects, conflicts, and/or errors from being introduced into the system 100 and/or the application under evaluation 230. In certain embodiments, the system 100 and methods may also provide effective computing resource management by utilizing the features and functions described in the present disclosure. For example, in certain embodiments, the system 100 may specify a quantity of computer processor resources (e.g. processor clock cycles, processor speed, processor cache, etc.) that may be dedicated to obtaining data from data from the external and internal data sources 202, 201, evaluating and testing the application under evaluation 230, updating the agglomerated models 208, conducting static and dynamic model discovery, and performing any other operations conducted by the system 100, or any combination thereof. For example, the system 100 may indicate a quantity of processor cycles of a processor that may be utilized to obtain data, process obtained data, and/or specify a selected amount of processing power that may be dedicated to evaluating the application under evaluation 230 or conducting the static and dynamic model discovery.

In certain embodiments, any device or program in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods 300, 700, 900 at time periods when usage of processing resources and/or memory resources in the system 100 is at a selected and/or threshold value. In certain embodiments, the system 100 and methods may include transmitting signals to the memory devices utilized in the system 100, which indicate which specific portions (e.g. memory sectors, etc.) of the memory should be utilized to store any of the data utilized or generated by the system 100. Notably, the signals transmitted to the processors and memories may be utilized to optimize the usage of computing resources while executing the operations conducted by the system 100. As a result, such features provide substantial operational efficiencies and improvements over existing technologies.

Figure 10:
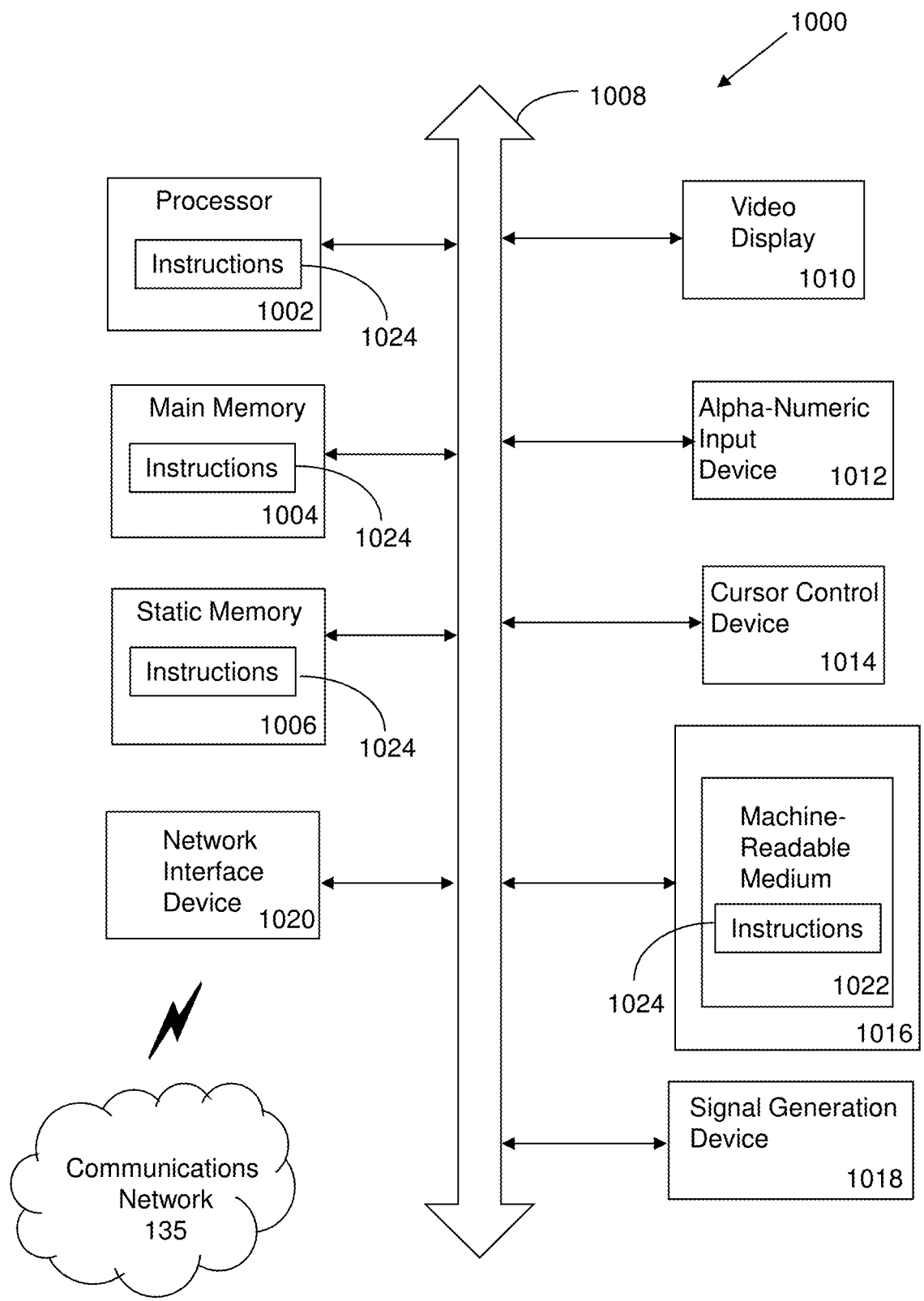
FIG. 10 is a schematic diagram of a machine in the form of a computer system within which a set of instructions, when executed, may cause the machine to perform any one or more of the methodologies or operations of the systems and methods for autonomously testing a computing system.

Referring now also to FIG. 10, at least a portion of the methodologies and techniques described with respect to the exemplary embodiments of the system 100 can incorporate a machine, such as, but not limited to, computer system 1000, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 150, the database 155, the server 160, or any combination thereof. The machine may assist with operations performed by the static model discovery module 200, the model change management module 204, the dynamic module discovery module 206, the controller 224, the learning engine 226, evaluators 220, the application under evaluation 230, the data transformers 232, any other component in the system, any programs in the system, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010, which may be, but is not limited to, a liquid crystal display (LCD), a flat panel, a solid state display, or a cathode ray tube (CRT). The computer system 1000 may include an input device 1012, such as, but not limited to, a keyboard, a cursor control device 1014, such as, but not limited to, a mouse, a disk drive unit 1016, a signal generation device 1018, such as, but not limited to, a speaker or remote control, and a network interface device 1020.

The disk drive unit 1016 may include a machine-readable medium 1022 on which is stored one or more sets of instructions 1024, such as, but not limited to, software embodying any one or more of the methodologies or functions described herein, including those methods illustrated above. The instructions 1024 may also reside, completely or at least partially, within the main memory 1004, the static memory 1006, or within the processor 1002, or a combination thereof, during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1022 containing instructions 1024 so that a device connected to the communications network 135, another network, or a combination thereof, can send or receive voice, video or data, and communicate over the communications network 135, another network, or a combination thereof, using the instructions. The instructions 1024 may further be transmitted or received over the communications network 135, another network, or a combination thereof, via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions; and
a processor that executes the instructions to perform operations, the operations comprising:
parsing data obtained from a source to generate parsed data;
extracting a source concept from the parsed data;
updating, based on the source concept extracted from the parsed data, a model from a set of agglomerated models to update the set of agglomerated models;
interacting with an application under evaluation by the system via an input;
receiving an output from the application under evaluation based on the interacting conducted with the application under evaluation via the input;
updating, by utilizing the output, the set of agglomerated models; and
recursively updating the set of agglomerated models over time as further data is obtained, as further interacting is conducted with the application under evaluation, as interacting is conducted with another application under evaluation, or a combination thereof.

2. The system of claim 1, wherein the operations further comprise validating, by utilizing a hypothesis test, the set of agglomerated models to produce a set of validated agglomerated models.

3. The system of claim 1, wherein the operations further comprise executing, by utilizing the set of agglomerated models, a test on the application under evaluation.

4. The system of claim 3, wherein the operations further comprise generating, if the executing of the test indicates a defect in the application under evaluation, a report indicating the defect in the application under evaluation.

5. The system of claim 4, wherein the operations further comprise generating software code to fix the defect in the application under evaluation, and wherein the operations further comprise integrating the software code into the application under evaluation to fix the defect.

6. The system of claim 1, wherein the operations further comprise refining, based on the set of agglomerated models, the source concept, and wherein the operations further comprise refining a hypothesis associated with one or more models in the set of agglomerated models.

7. The system of claim 1, wherein the operations further comprise determining the input from the set of agglomerated models.

8. The system of claim 1, wherein the data obtained from the source comprises a requirement, a user story, a document, domain knowledge, external information, a test case, software code, or a combination thereof, and wherein at least a portion of the data is related to functionality of the application under evaluation by the system, a performance requirement of the application under evaluation, a metric associated with the application under evaluation, or a combination thereof.

9. The system of claim 1, wherein the operations further comprise determining that a new source of additional data exists, wherein the operations further comprise determining if a source parsing model of the agglomerated models has been altered by a threshold amount, and wherein the operations further comprise parsing the additional data from the new source to generate additional parsed data if the source parsing model has been altered by the threshold amount.

10. The system of claim 9, wherein the operations further comprise determining if a concept extraction model of the agglomerated models has been altered by a threshold amount, wherein the operations further comprise extracting an additional source concept from the additional parsed data, and wherein the operations further comprise updating, based on the additional source concept, the set of agglomerated models.

11. The system of claim 1, wherein the operations further comprise selecting an executor for executing a series of steps on the application under evaluation while interacting with the application to dynamically explore and create a model of the application under evaluation for inclusion in the agglomerated models.

12. The system of claim 11, wherein the operations further comprise selecting an exploration start location within the application under evaluation for executing the series of steps, and wherein the operations further comprise accessing the application under evaluation after selecting the exploration start location.

13. The system of claim 12, wherein the operations further comprise executing a first step in the series of steps on the application under evaluation, wherein the operations further comprise determining if the first step corresponds with the exploration start location, and wherein the operations further comprise executing, if the first step does not correspond with the exploration start location, subsequent steps in the series of steps until the exploration start location is reached.

14. The system of claim 13, wherein the operations further comprise selecting a next exploration step to execute on the application under evaluation after the exploration start location is reached, wherein the operations further comprise executing the next exploration step and subsequent exploration steps on the application under evaluation until completion of a dynamic discovery session.

15. The system of claim 14, wherein the operations further comprise utilizing outputs generated based on execution of the next exploration step and the subsequent exploration steps to update the set of agglomerated models.

16. The system of claim 1, wherein the operations further comprise utilizing a test executed on the application under evaluation to adjust confidences associated with models in the set of agglomerated models.

17. The system of claim 16, wherein the operations further comprise receiving feedback indicating that a defect indicated based on execution of the test is inaccurate.

18. The system of claim 17, wherein the operations further comprise adjusting a confidence for a model in the set of agglomerated models based on the feedback.

19. A method, comprising:
parsing data obtained from a source to generate parsed data;
extracting a source concept from the parsed data;
generating, based on the source concept extracted from the parsed data, a first model for inclusion in a set of agglomerated models;
interacting with an application under evaluation via an input;
receiving an output from the application under evaluation based on the interacting conducted with the application via the input;
generating, by utilizing the output, a second model for inclusion in the set of agglomerated models, wherein the second model is correlated with the application under evaluation;

executing, by utilizing the set of agglomerated models, a test on the application under evaluation, wherein the executing is performed by utilizing instructions from a memory that are executed by a processor; and
determining, based on executing the test, whether the application under evaluation operates in an expected manner.

20. The method of claim 19, further comprising recursively updating the set of agglomerated models over time as further data is obtained, as further interacting is conducted with the application under evaluation, as interacting is conducted with another application under evaluation, or a combination thereof.

21. The method of claim 19, further comprising utilizing the set of agglomerated models to output a validated subset agglomerated model of the application under evaluation to generate a response to one or more inputs received from a user, device, a program, an external user, an external device, an external program, or a combination thereof.

22. The method of claim 21, wherein the validated subset agglomerated model of the application under evaluation includes an execution path, and further comprising utilizing the execution path to generate a response to a request received from a user, device, a program, an external user, an external device, an external program, or a combination thereof.

23. The method of claim 22, further comprising generating, by utilizing a media converter, viewable media content including each step in the execution path utilized to generate the response to the request.

24. The method of claim 19, further comprising generating an autopilot feature, which upon being accessed, enables navigation from an initial state of the application to a target state of the application.

25. The method of claim 19, further comprising generating, in response to a request from a user or device, an extension function for incorporation into the application under evaluation, wherein the extension function adds functionality to the application under evaluation, adjusts a performance of the application under evaluation, or a combination thereof.

26. The method of claim 25, further comprising executing a test on the extension function to validate that the extension function operates as requested in the request prior to incorporating the extension function into the application under evaluation.

27. A non-transitory computer-readable device comprising instructions, which when loaded and executed by a processor, cause the processor to perform operations comprising:
parsing data obtained from a source to generate parsed data;
extracting a source concept from the parsed data;
generating, based on the source concept extracted from the parsed data, a first model for inclusion in a set of agglomerated models;
interacting with an application under evaluation via an input;
receiving an output from the application under evaluation based on the interacting conducted with the application via the input;
generating, by utilizing the output, a second model for inclusion in the set of agglomerated models, wherein the second model is correlated with the application under evaluation; and
recursively updating the set of agglomerated models over time as further data is obtained, as further interacting is conducted with the application under evaluation, as interacting is conducted with another application under evaluation, or a combination thereof.

* * * * *